(12) United States Patent
Noss

(10) Patent No.: US 11,673,050 B2
(45) Date of Patent: *Jun. 13, 2023

(54) NODE BASED WORLD MAPPING FOR FINITE, DEPTH FIRST SEARCH

(71) Applicant: Sony Interactive Entertainment LLC, San Mateo, CA (US)

(72) Inventor: Landon Noss, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,725

(22) Filed: Aug. 26, 2021

(65) Prior Publication Data

US 2021/0387091 A1 Dec. 16, 2021

Related U.S. Application Data

(63) Continuation of application No. 16/568,027, filed on Sep. 11, 2019, now Pat. No. 11,117,053.

(51) Int. Cl.
*A63F 9/24* (2006.01)
*A63F 13/5375* (2014.01)
(Continued)

(52) U.S. Cl.
CPC ........ *A63F 13/5375* (2014.09); *A63F 13/533* (2014.09); *A63F 13/5378* (2014.09);
(Continued)

(58) Field of Classification Search
CPC .............. A63F 13/335; A63F 2300/305; A63F 2300/306; A63F 2300/307; A63F 13/5375;
(Continued)

(56) References Cited

U.S. PATENT DOCUMENTS 8,753,183 B2 * 6/2014 Davison ................ A63F 13/355 463/9
10,427,047 B2 * 10/2019 Benedetto ............. A63F 13/215
(Continued)

OTHER PUBLICATIONS

"QuestHelper", Apr. 20, 2015, wowwiki.fandom.com, <https://wowwiki.fandom.com/wiki/QuestHelper?oldid=2757372>(Year: 2015) (Year: 2015).*

(Continued)

*Primary Examiner* — Justin L Myhr

(74) *Attorney, Agent, or Firm* — Penilla IP, APC

(57) ABSTRACT

Methods and systems for providing assistance for an online game executed by a cloud gaming system includes receiving a game objective of a user playing the online game. A current location of the user in the online game is identified. A map of vector points defined for the online game is traversed in a backward direction from a vector point corresponding to location of the game objective to the current location, to identify vector points corresponding to activities performed by a plurality of prior players to achieve the game objective for the online game. A predicate list of the activities identified from the traversing is generated for presenting to the user. The predicate list specifies a sequence in which the activities need to be performed to achieve the game objective. The activities presented in the predicate list are dynamically adjusted based on changes to the current location of the user detected in the online game.

19 Claims, 13 Drawing Sheets

| Current location | Destination location | Predicate list of players (friends or social contacts or players) |
|---|---|---|
| A | B | Player P1 – A --> A1* --> A2 --> B |
| A | B | Player P2 – A --> B1 --> B2* --> B |

\* - macro activity indicator

(51) Int. Cl.
*A63F 13/533* (2014.01)
*A63F 13/5378* (2014.01)

(52) U.S. Cl.
CPC ... *A63F 2300/305* (2013.01); *A63F 2300/306* (2013.01); *A63F 2300/307* (2013.01)

(58) Field of Classification Search
CPC .... A63F 13/533; A63F 13/5378; A63F 13/35; A63F 13/422; A63F 13/69; A63F 13/79; A63F 13/85; H04L 67/38
See application file for complete search history.

(56) References Cited

U.S. PATENT DOCUMENTS

| | | | | |
|---|---|---|---|---|
| 2005/0246638 | A1* | 11/2005 | Whitten | A63F 13/5375 715/708 |
| 2007/0294089 | A1* | 12/2007 | Garbow | G07F 17/323 705/14.18 |
| 2009/0327520 | A1* | 12/2009 | Lee | H04L 67/306 709/240 |
| 2012/0021840 | A1* | 1/2012 | Johnson | A63F 13/60 463/43 |
| 2013/0005471 | A1* | 1/2013 | Chung | A63F 13/86 463/42 |
| 2014/0278686 | A1* | 9/2014 | Mullings | G06Q 10/1097 705/7.21 |

OTHER PUBLICATIONS

"Realm", Nov. 16, 2014, wowwiki.fandom.com, <https://wowwiki.fandom.com/wiki/Realm?oldid=2737487> (Year: 2014) (Year: 2014).*

* cited by examiner

| Current location | Destination location | Predicate list of players (friends or social contacts or players) |
|---|---|---|
| A | B | Player P1 – A --> A1* --> A2 --> B |
| A | B | Player P2 – A --> B1 --> B2* --> B |

* - macro activity indicator

| Current location | Destination location | Predicate list of players (friends or social contacts or players) |
|---|---|---|
| A | B | Player P1's path – A --> a1 --> a2 --> B |
| A | B | Player P2's path – A --> a3 --> a5 --> a6 → B |
| A | B | Player P3's path – A --> a1 --> a4 --> a2 → B |
| A | B | Player P4's path – A --> a1 --> a4 --> a6 → B |
| A | B | Player P5's path – A --> a7 --> a4 → a5 --> a6 → B |
| A | B | Player P6's path – A --> a7 --> a4 --> a2 → B |
| A | B | Player P7's path – A --> a3 --> a8 → a5 --> a6 → B |
| A | B | Player P8's path – A --> a3 --> a4 --> a2 → B |
| A | B | Player P9's path – A --> a3 --> a4 → a5 --> a6 → B |
| ---- | ---- | ---- |

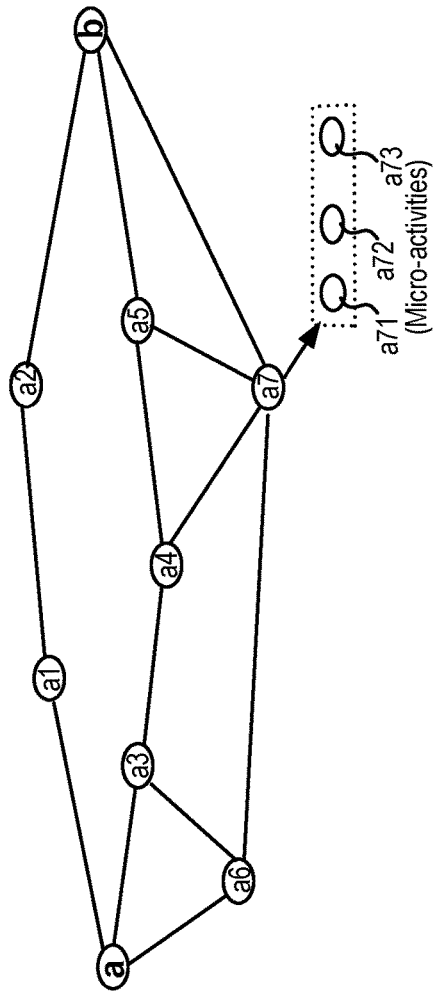

| Current location | Destination location | Predicate list of players (i.e., friends or social contacts) | Time to complete |
|---|---|---|---|
| a | b | Player A's path – a → a1 → a2 → b | 7 mins |
| a | b | Player B's path – a → a3 → a4 → a5 → b | 12 mins |
| a | b | Player C's path – a → a6 → a7 → b | 4 mins |
| a | b | Player D's path – a → a6 → a3 → a4 → a7 → a5 → b | 17 mins |

| Game objective | Recommended predicate list |
|---|---|
| 1. Fastest way to reach vector point b | Player C's path – a → a6 → a7 → b |
| 2. visit many places before reaching vector point b | Player D's path – a → a6 → a3 → a4 → a7 → a5 → b |

Figure 5

@time T1:

| Activity name | Activity Description | Predicates | Time | Destn. level | Rewards |
|---|---|---|---|---|---|
| A3 | Build bridge # 1 | GA1 -> GA2 -> GA3 | 10 mins | L8 | Trophy 7 |

Figure 7C

@time T2:

| Activity name | Activity Description | Predicates | Time | Destn. level | Rewards |
|---|---|---|---|---|---|
| GA1 | Build bridge # 1 | GA2 -> GA3 | 6 mins | L8 | Trophy 7 |

Figure 7D

@time T2:

Activity view dynamically updated

| Activity name | Activity Description | sel | Predicates | Time | Destn. level | Rewards |
|---|---|---|---|---|---|---|
| A3 (Pinned activity) | Build bridge | ☑ | ∞ | 6 mins | L8 | Trophy 7 |
| A6 | Row boat | ☐ | | | | |
| A12 | Build fire | ☐ | | | | |
| A7 | Kill Monster | ☐ | | | | |
| A8 | Climb hill 3 | ☐ | | | | |

GA1 play

Portion of Game world view

Figure 7E

NODE BASED WORLD MAPPING FOR FINITE, DEPTH FIRST SEARCH

CLAIM OF PRIORITY

This application is a Continuation of U.S. application Ser. No. 16/568,027, filed on Sep. 11, 2019, entitled "Node Based World Mapping for Finite, Depth First Search," which is incorporated herein by reference in its entirety for all purposes.

TECHNICAL FIELD

The present disclosure is related to providing game assistance for an online game, and more specifically to building an artificial intelligence (AI) model using information from game play sessions of a plurality of prior players and using the AI model to provide a predicate list of activities to a user to follow to progress in the online game.

BACKGROUND OF THE DISCLOSURE

Online games have gained popularity in recent years. The online games are of two types. One type of the online game is where the online game is executed on a client device (e.g., mobile device, PC, a laptop computer, etc.,) and the meta-data related to game play generated at the client device is shared with a server to which the client device is communicatively connected. Another type of online game is streaming online game, wherein the online game is executed on one or more servers and game data is streamed to the client device for rendering. Streaming online games, especially, massive multi-player online (MMO) games are more popular as they can be accessed by a vast number of users simultaneously via a network of computers distributed across a wide geography. The MMO games use a lot of resources for executing game logic and require a lot of coordination, in order to provide a satisfactory game play experience to users. In order to ensure the users who are located in different geo locations have access to the online game, the online game is executed on a game cloud using the resources of the cloud gaming system. The users are able to connect to the online game executing on one or more servers of the cloud gaming system. The advantage of executing the online games on the game cloud is that the resources required for the execution of the game are centralized.

Since the game can be progressed in multiple possible directions, a player can easily get lost in the game and not be able to have satisfactory game play experience. The online game is unable to provide hints to the user to progress in the game as the online game is unable to predict a direction the user is willing to take.

It is in this context that embodiments of the disclosure arise.

SUMMARY

Embodiments of the present disclosure relate to systems and methods for providing assistance to a user to progress in an online game. The system first identifies a current location of a user in the online game. The system may use in-game global positioning system (GPS) to identify and track the current location of the user. The system traverses a map of the online game to identify various vector points that are available in a vicinity of the current location of the user. The map generated for the online game identifies all vector points that are available in the online game, wherein each vector point is associated with an activity. The map identifying all the vector points is also referred to herein as an "identity" map. The vector points identified from the traversal of the identity map define various activities that are available to the user in a vicinity of the user's current location. A predicate list is generated for presenting to the user using the activities that were identified in the vicinity of the user's current location. The predicate list identifies predicates for achieving each activity identified in the predicate list, the predicates for an activity identifies a list of other activities and a sequence in which the other activities have to be performed to achieve the activity. The identified activities may be filtered in accordance to user attributes of the user so that only those activities that the user is eligible to perform remain in the predicate list. The predicate list is presented to the user in an interactive interface on a screen of a computing device that is used by the user to access and play the online game.

Alternately, the user may specify a game objective (i.e., an activity or level or type or goal) that the user wants to accomplish in the online game. In this case, the online game system may traverse a map of vector points defined for the online game in a backward direction from a location related to the game objective to the current location of the user in the online game using information provided in a predicate model generated using machine learning algorithm. The predicate model is generated and trained using game play details from game sessions of the prior players that played the online game. The plurality of prior players may have achieved the same game objective specified by the user by following different paths from the current location and performing activities along those different paths. Data obtained from the backward traversal is used to identify vector points corresponding to specific ones of activities performed by a plurality of prior players to achieve the game objective. A predicate list is generated for rendering to the user. The predicate list identifies activities that the user needs to perform to achieve the game objective. The predicate model generated for the online game may be updated using current game play of the user, based on the current location of the user.

In some cases, the backward traversal may be made in accordance to specifics provided in the game objective by the user. The game objective may include not only an activity or level or location that the user wishes to achieve but may also provide other details of how the user wants to achieve the objective. For example, the user may specify that he would like to get from the current location (i.e., point A) to the location of the game object (i.e., point B) in the fastest possible time or via a shortest path or visit maximum number of locations on their way to achieving the game objective. The shortest path may not necessarily mean fastest time as the shortest path may include more challenging activities. The user may specify long path as the user may wish to visit as many localities in the online game as possible, when the long path is shown to include activities that are distributed across a number of locations. Instead of going directly from the current location to the location of the game objective, the prior players may have strayed away from the direct path to perform other activities along the way. The predicate model generated for the online game includes details of the other activities that some of the players may have performed on their route to accomplishing the game objective. In addition to the activities identified from the prior players' game play, the predicate list, in some implementation, may also include other activities that are in the vicinity of the current location or in the vicinity of the locations related to the one or more activities included in the predicate list. These other activities may be identified based on the activity type and/or based on user attributes of the user and/or game objective of the user or to just inform the user of the different types of activities that are available to the user.

The online game system collects telemetry data from the game play sessions of a plurality of prior players and uses the telemetry data to generate the predicate model. The predicate model provides information of the different routes taken and activities performed by each prior player, number of players that performed each activity, amount of time taken by each player to perform each activity, etc. Information from the predicate model is used with the identity map of the online game to identify the activities for the user to achieve the game objective. The identified activities are provided to the user in the form of a predicate list, which includes a sequence in which the identified activities have to be performed to progress in the online game or achieve the expressed game objective. The activities selected for inclusion in the predicate list may be filtered in accordance to the user attributes of the user so that only those activities that the user is eligible to perform are included in the predicate list.

As the user selects an activity from the predicate list or from a vicinity of the current location, the current location of the user may change. In response to detecting a change in the current location, the predicate list of activities provided for the user gets dynamically updated so that the activities identified in the predicate list reflects the set of activities that are appropriate for the changed location of the user. A progression graph may be generated for the user for the online game. The user's progression graph may be populated to identify locations of the activities the user has completed, the activities that are in the predicate list and activities that are in the vicinity of the current location and in the vicinity of the activities in the predicate list.

The predicate model is generated using a machine learning algorithm within a predicate list generator engine executing on a game server that executes the online game. The predicate model includes a plurality of nodes with edges connecting two consecutive nodes. Each node represents characteristics of an activity identified from the telemetry data of a plurality of prior players and each edge between any two consecutive nodes identifies a relationship between the properties of the activities in the corresponding two consecutive nodes. The relationship may include requirements for accessing an activity and completing the activity represented in a particular node. Ongoing activities performed by the plurality of players playing the online game is gathered and used to further train the predicate model. The predicate list generator engine uses the data from the predicate model to generate and update the predicate list provided to the user based on changes to the user's current location in the online game.

In one implementation, a method for providing assistance in an online game is disclosed. The method includes receiving a game objective of a user playing the online game. A current location of the user in the online game is identified. A map of vector points generated for the online game is traversed in a backward direction from a location of a vector point related to the game objective to a vector point related to the current location of the user to identify vector points corresponding to activities performed by a plurality of prior players to achieve the game objective. Each vector point in the map corresponds to an activity that can be performed in the online game. A predicate list of the activities identified from the traversing, is provided for presenting to the user.

The predicate list specifies a sequence in which the activities need to be performed by the user to achieve the game objective of the online game. The predicate list is dynamically adjusted based on changes to the current location of the user detected as the user progresses in the online game.

In an alternate implementation, a method for providing assistance in an online game is disclosed. The method includes identifying a current location of a user in the online game. A map of the online game is traversed to identify vector points that are available in a vicinity of the current location of the user. Each vector point on the map of the online game represents an activity that the user can perform. The vector points identified for the user dynamically change based on changes to the current location of the user detected during game play, as the user progresses in the online game. A predicate list for achieving the activities associated with the vector points identified in the vicinity of the current location of the user is provided for presenting to the user. Each set of predicates in the predicate list identifies other activities that need to be achieved as part of achieving a corresponding activity identified from the traversal and a sequence in which the other activities has to be achieved in order to achieve the corresponding activity in the online game. The predicate list is dynamically adjusted in accordance to changes to the vector points identified for the user based on changes to the current location as the user progresses in the online game.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 5 illustrates examples of predicate lists presented to a user based on game objective expressed by the user, in accordance with one implementation of the present disclosure.

FIGS. 7A-7C illustrate different ways of presenting predicate list to a user, in accordance with various implementations.

FIGS. 7D and 7E illustrate dynamically updated views of a predicate list of an activity selected by a user, in accordance with different implementations.

DETAILED DESCRIPTION

Figure 1:
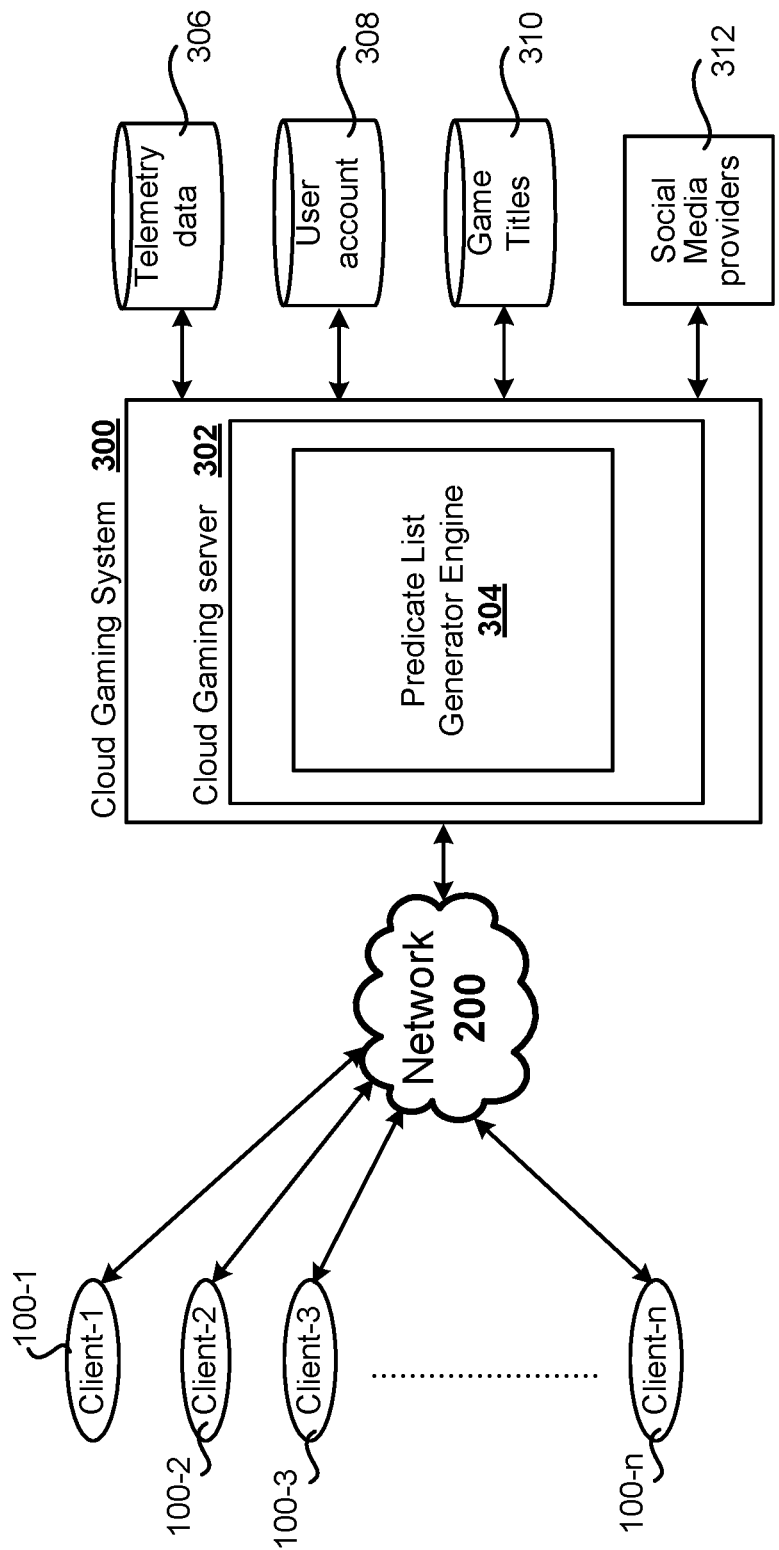
FIG. 1 illustrates a simplified physical view of a cloud gaming system that is used in providing assistance to a user to progress in the online game, in accordance with one implementation of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various implementations of the present disclosure describe systems and methods for implementing machine learning algorithm to generate models (i.e., predicate model) depicting the different activities each prior player accomplished as each prior player (or simply referred from here onwards as "player") played the online game executing on a cloud gaming system. The predicate model captures the route taken by each player, the activities that they accomplished at different stages of the online game, the game objectives that they accomplished and an amount of progression they have made in the online game. The predicate model is built and trained using telemetry data obtained from game session(s) of the plurality of players that have played the online game. The other players may be players that are part of a league or individual players or social contacts of the user that have played or are currently playing the online game. The telemetry data is analyzed to identify characteristics of each activity of the online game and user attributes of each of the plurality of players who accomplished each activity of the online game. Information provided in the predicate model is used along with an identity map generated for the online game to identify the activities for the user. The identity map is a three-dimensional (3D) map that shows different vector points that are available in the online game, wherein each vector point corresponds to an activity that can be performed in the online game. The predicate model (i.e., an artificial intelligence (AI) model) generated using machine learning algorithm includes nodes and an edge connecting two consecutive nodes. Each node in the predicate model corresponds to an activity performed by one or more players in the online game and the edge represents a relationship between the activities in the two consecutive nodes. The node may include characteristics of the activity, such as activity name or title, activity type, activity level, location of activity, game level from where the activity was accessed, skill set or tools that each player possessed when the player achieved the activity, skill set required to accomplish the activity, number of players that attempted the activity, number of players that accomplished the activity, time taken by each player to accomplish the activity, etc. The edge identifies the relationship between the activities represented in the nodes connected by the edge. The relationship characteristics of the edge may include information related to attribute requirements for accessing the activity, such as level, points, tools, skill sets, etc. Each activity represented in a node of the predicate model is associated with a weight based on a number of players that have attempted and accomplished the activity, frequency at which the activity was accessed and achieved, difficulty level the activity, etc.

The telemetry data captures the details of each player's game play and provides sufficient information to identify routes followed by different players to reach a certain level or a certain activity within a level of the online game, time taken by each player to achieve each activity and to reach a certain level or activity from which it is easy to deduce players who reached a certain level or activity faster, players who have accomplished a certain activity faster than other players, player(s) who have performed the most activities, players who have performed the least number of activities to reach a goal or game objective, players who have taken the shortest route to reach a certain level or activity, players who have visited the most places within the online game, players who have collected the maximum points or trophies or tools, types of activities that allow a player to collect points or trophies or currencies or tools and location of those activities within the online game, activities that are macro activities and include a plurality of micro activities, etc. A machine learning algorithm included in the generator engine and used to build and train the predicate model harvests the game play details from the telemetry data collected from the game play sessions of the various players, and updates the details to the predicate model during training.

When a user accesses the online game for game play and specifies a game objective that the user wants to accomplish in the online game, information provided in the predicate model is used to traverse an identity map of the online game in a backward direction from a location (i.e., vector point) where the game objective is disposed in the identity map of the online game to the current location of the user in order to identify a list of activities that the user can perform to achieve the game objective. The activities may be identified based on the user attributes of the user (such as the skill sets, the tools, the levels, etc., the user possesses that may be required for accomplishing the activity) and the weights associated with the activities in the predicate model. The activities identified from the backward traversal may be used to generate a predicate list that is presented on an interactive user interface of a client device of a user who selected the game for game play. The predicate list not only identifies the list of activities that has to be performed but also a sequence in which these activities has to be performed for achieving the game objective in the online game.

In some implementations, the game objective may identify a specific level or a specific activity or an event or a location that the user desires to reach/accomplish. In addition to the aforementioned list of what is specified in a game objective, the game objective may also specify characteristics of the route desired by the user (e.g., faster route, slower route, longer route, shorter route, etc.). As the user attempts an activity from the predicate list, the activities in the predicate list are dynamically updated, based on changes to current location of the user in the online game. Additionally, the current location is updated to the identity map and the game play of the user is used to train the predicate model generated for the online game. The updated map and the predicate model are used to provide additional assistance to the user to enable the user to progress in the online game. Information from the game play of the user may also be used to generate and populate a progression graph for the user. Information provided in the progression graph may be presented to the user in a map format.

In an alternate implementation, a current location of the user in the online game is determined and the identity map of the online game may be traversed to identify various activities that are in the vicinity of the current location of the user. Based on the information provided in the identity map, a predicate list is generated for the activities identified in the vicinity of the user, wherein the predicate list identifies other activities that need to be performed and a sequence in which the other activities have to be performed to achieve each activity identified in the vicinity of the current location of the user. One or more of the other activities identified in the predicate list may be outside the vicinity of the current location. In some implementation, the activities in the vicinity of the current location of the user may be identified based on characteristics of the activities, such as activity type, activity level, activity location, activity dependency, etc. The activities may also specify attributes of the user, such as level, skill set, points, tools, winnings, or lives, etc., needed to accomplish the activity. Of course, the aforementioned list is provided as an example and that other user attributes may also be used in identifying the activities in the vicinity of the user. User selection of an activity from the predicate list may result in a change in the current location of the user. The change to the current location of the user is used to dynamically update the activities in the predicate list. Further, the activities attempted and accomplished by the user are used to dynamically update the identity map and the predicate model of the online game and a progression graph of the user. The progression graph is used to provide a visual map of the activities that have been completed by the user, and the activities that are currently available to the user based on the updated current location of the user, and the predicate list identifies that updated list of activities that are available to the user to progress in the online game.

In some implementations, the activities that are identified for inclusion in the predicate list may be filtered in accordance with the game play attributes of the user, so that only those activities that the user is qualified to access and perform are presented in the predicate list. For example, a user may currently be at level 4 and may be qualified to perform an activity at level 5 as he has, for example, the necessary skills, tools, points, game winnings, game chances/lives, or is at the level that is required for accessing the level 5 activity. Further, the user may not be qualified to perform an activity at level 7 as he does not currently have the necessary skills, or has not accumulated sufficient points or tools. In this example, the predicate list presented to the user may include a list of other activities that can be performed to achieve activity at level 5 but may not include the list of other activities for achieving activity at level 7, even though the activity at level 7 is in the vicinity of the current location of the user. Alternately, the predicate list may include the list of other activities for achieving the activity in level 5 as well as the activity in level 7 and the other activities selected for achieving the activity in level 7 may include other activities that will provide the necessary skill set or game winnings to attempt and achieve the activity in level 7 and the sequence of the activities specified in the predicate list will allow the user to accumulate the skills or points or tools or level required for accessing and completing the level 7 activity.

A user may set up their user account at a cloud gaming system to enable the user to access the various online games available therein. One or more cloud gaming servers of the cloud gaming system may execute an instance of an online game locally on the cloud and provide streaming content to a client device of the user for rendering. As the user plays the online game and provides game inputs, the game inputs are transmitted to the cloud gaming server(s) to affect an outcome of the online game. During game play of the online game by the user, a predicate list generator engine (simply referred to as "generator engine") executing on the cloud gaming system determines the current location of the user using in-game global positioning system (GPS), identifies any game objective expressed by the user, the game play attributes of the user, the characteristics of each activity in the vicinity of the current location of the user, characteristics of each activity identified to achieve the game objective, and generates the predicate list for the user to assist the user to progress in the online game. The predicate list identifies a sequence of activities that can be performed by the user to achieve their game objective to allow the user to progress in the online game.

The sequence of activities is determined from the predicate model in conjunction with the identity map of the online game to provide an optimal route for the user to take to achieve the game objective or to progress in the game. The user may select an activity from the predicate list and progress in the online game or may select an activity in the vicinity of the current location or in the vicinity of an activity from the predicate list. As the user selects the activity and progresses in the online game, the current location of the user is dynamically updated to a location that corresponds to the selected activity. In response to detecting a change in the current location, the activities in the predicate list get dynamically updated to include activities that are based on the updated current location of the user.

Conventional way of providing hints included a user searching for a game objective and the game system would identify a list of activities that has to be done to get to the game objective. This list is usually obtained from game logic of the game. The conventional system did not have the capability to track the user's current location within the online game and to search for activities that can be performed based on the user's current location, and to update the activities based on changes detected to the current location of the user. As a result, the list provided by the conventional systems is static in nature and does not change with the changing location of the user as the user progresses in the online game.

The current online game system, on the contrary, engages a predicate list generator engine that is able to keep track of the current location of the user in the online game and use the current location to present a predicate list of activities that the user can perform next to either progress in the online game or to achieve a game objective of the user. The in-game GPS tracks the current location of the user as the user progresses through the online game, and a generator engine within the online game engine or available within a cloud gaming server uses telemetry data from the game play sessions of a plurality of players that have played the online game to train a predicate model generated for the online game with routes followed or activities accomplished by the plurality of players as they progressed through the online game. An activity may be a simple instruction that the user may have to follow, or an action that the user has to perform, etc. The predicate model is trained in real time with additional game play data obtained from game play sessions of the plurality of players and is used with an identity map generated for the online game to identify the predicate list of activities, based on the current location of the user. The identity map is a three-dimensional (3D) map that includes a plurality of vector points, with each vector points representing an activity that a user can perform in the online game.

With the general understanding of the inventive embodiments, example details of the various implementations will now be described with reference to the various drawings.

FIG. 1 provides an overview of a cloud gaming system 300 used for providing assistance to a user during game play of the online game, in accordance with one implementation. A plurality of client devices 100 (100-1, 100-2, 100-3, ... 100-n) are used by different players (i.e., users who play an online game) to access the cloud gaming system (CGS) 300, social media applications, and other interactive applications over a network 200, such as the Internet. The client devices may be accessing the CGS 300 from different geo locations. The client devices can be any type of client computing device having a processor, memory, having LAN, wired, wireless or 5G communication capabilities, and being portable or not portable. For example, the client devices can be smartphones, mobile devices, tablet computers, desktop computers, personal computers, wearable devices, or hybrids or other digital devices that include monitors or touch screens with a portable form factor.

The client devices having 5G communication capabilities may include mobile devices or any other computing devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

The client devices may run an operating system and include network interfaces that provide access to various game applications or interactive applications (apps) available on the cloud gaming servers in the CGS 300 over the network 200 or could be thin clients with network interface to communicate with the cloud gaming servers 302, which provide the computation functions. Players may access the CGS 300 using a user account and select an online game available at the CGS 300 for game play, wherein the game play is controlled by the players using control options provided in the client devices or using controllers that are communicatively connected to the client devices. The user account of a player may be verified against user data stored in user account data store 308 to ensure the player is eligible to access and play a game title of the online game stored in the game titles data store 310, prior to providing access to the online game.

In some implementations, the various applications (e.g., online games) may be executed remotely on one or more servers 302 of the cloud gaming system 300 and game play related data from the executing application streamed to the client device 100 over the network 200. In other implementations, the online games may be executed locally at the client devices and metadata from the executing online game may be transmitted over the network 200 to the cloud gaming server(s) 302 for affecting the game state. Game play data collected from a plurality of players game play sessions for the online game is used to create and train a predicate model (i.e., an artificial intelligence (AI) model) that is used to identify activities for a user to progress in the online game. The activities identified for the user are presented in the form of a predicate list that identifies a sequence in which the activities need to be performed by a user to progress in the online game. It should be noted that the players and users both refer to people/persons who have a user account and are eligible to access and interact with the applications (including online games) that are available on the cloud gaming system 300. In the various implementations described throughout this application, where possible, a "player" is used to refer to a person who has previously played an online game and a "user" is used to refer to a person who has currently selected the online game for game play (e.g., a person that has not played the online game previously).

The cloud gaming system (CGS) 300 may include a network of back-end servers 302 that are distributed across different geo locations and are configured to execute instances of one or more online game applications and/or other interactive applications that are available at the back-end server. The back-end server 302 may be a cloud gaming server or cloud application server that is configured to execute one or more instances of the one or more online games/interactive applications. For purpose of simplicity, reference will be made to a cloud gaming server (or simply a "game server") executing an instance of an online game application, although the implementations disclosed herein can be extended to any other interactive applications that may be used to provide assistance to a user, based on the current location of the user in the interactive application, to enable the user to progress in the interactive application. The game server may be any type of server computing device available in the cloud gaming system, including, but not limited to, a stand-alone server, a server that is part of a server farm or data center, etc. Further, the game server may manage one or more virtual machines supporting a game processor that executes an instance of an online game for a user, on a host.

The online game executed by the cloud gaming server 302 may be a single player game or a multi-player game. In some implementations, the online game may be a massive multi-player online (MMO) game that allows a plurality of players and users from across different geo locations to access and play the online game. The cloud gaming server 302 may include a multi-player distributed game engine that is communicatively connected to game logic of the online game. Generally speaking, a game engine is a software layer that serves as a foundation for a game, such as MMO game, and provides a framework that is used to develop the online game. The game engine abstracts the details of doing common related tasks (i.e., game engine tasks) required for every game, while the online game developers provide the game logic that provides the details of how the online game is to be played. The game engine framework includes a plurality of reusable components for processing several functional portions (i.e., core features) for the online game that bring the online game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the online game.

During game play of an online game, the game engine manages the game logic of the online game, collects and transmits players inputs received from different client devices to the game logic, manages the allocation and synchronization of the functional portions of the game engine to process game data generated by the game logic, in an optimal manner, and generates frames of game data that is transmitted back to the client devices for rendering. A variety of game engines are currently available to provide different core functionalities and an appropriate game engine may be selected based on the functionalities specified for executing the online game.

The game logic analyzes the inputs provided by the players, users at the respective client devices during game play sessions, updates game state of the online game based on the inputs, manages saved data of each of the players, users playing the online game, and generates game data that is processed by the distributed game engine prior to being streamed to the client device of the user during the game play session. The game state identifies overall state of the online game at a particular point and is affected by intricacies of the game play of one or more players, users. The saved data of each player, user includes any game customization provided by the player, user for the online game. The distributed game engine, using the game state provided by the game logic, is able to overlay/insert objects and characters into the gaming environments of the player, user participating in the game play session. In some implementations, the game logic of each instance of the game may be executed on a server or on a plurality of servers, based on how the game logic is configured.

The game inputs provided during game play by each of the players of the online game, game state of the online game, the location of each of the players in the online game, and details of the activities performed by each of the players are stored as telemetry data in a telemetry data store 306 by the generator engine 304. The telemetry data identifies characteristics of each activity that a player attempted, accomplished, and player attributes of the player who attempted, accomplished each activity in the online game. The telemetry data associated with each player may be used to generate a progression graph for that player. The progression graph generated for a player is a sub-set of an identity map generated for the online game that identifies all vector points that are available in the online game. The identity map is a 3D map, with each vector point representing an activity that a player, user can perform in the online game. The progression graph of a player identifies a sub-set of activities of the online game that the player attempted and completed during the player's game play session of the online game and includes changes to the current location of the user. The telemetry data of the online game is used to generate and train a predicate model using machine learning algorithm available within the generator engine 304. Information provided in the predicate model is used to traverse the 3D identity map of the online game to provide assistance to a user that has selected the online game for game play. The assistance may be provided as a predicate list that identifies various activities and specific sequence in which the activities have to be performed to progress in the online game.

When a user accesses the online game for game play, the generator engine 304 uses in-game GPS to determine the current location of the user in the online game, and identifies the activities of the online game that are available in the vicinity of the current location of the user by traversing the identity map. The activities recommended for the user may be identified based on the user attributes so as to only include activities the user is eligible to perform in order to advance in the online game. Accordingly, the generator engine 304 may first determine the user attributes of the user. The user attributes may identify the in-game skills and game related winnings achieved by the user during game play of the online game, such as game level, speed, game points, game currency, game lives, game trophies, etc. The generator engine 304 may then analyze the characteristics of the activities identified in the vicinity of the current location of the user against the user attributes of the user to determine activities that the user is eligible to perform to advance in the online game, wherein the characteristics of the activities may include level of the activity, type of activity, requirements for accessing the activity, requirements for completing the activity, etc. The analysis may assist in identifying which activities the user has the skill set to access and which ones to ignore due to the user not possessing the required skills.

In addition to tracking the current location of the user, the generator engine 304 may receive a game objective from the user, wherein the game objective may be an activity, a level or an event, for example. The generator engine may refer to the predicate model (i.e., an AI model created and trained by a machine learning algorithm within the generator engine 304) to identify activities for the user based on activities performed by one or more players who have played the online game. The activities for the user may be identified based on the game objective expressed by the user and by analyzing attributes of the players that have achieved the respective activities, measuring the attributes of the user against the attributes of the player, and/or measuring the attributes of the user against the characteristics of the activities performed by the different players. The identified activities represent an optimal set of activities that the user has to complete to achieve the game objective. The identified activities are used to generate a predicate list for the user. In some implementations, the game objective may specify the type of players the user wishes to follow. For example, the user may specify a player with specific skill level, or a type of player (novice, medium level or expert level) or a friend to follow. In this example, the generator engine 304 may interact with social media providers 312 through appropriate APIs to access social graph of the user to identify the social contacts of the user and to filter out nodes that are associated with activities that were performed by other players who are not social contacts of the user. Information provided by the nodes related to activities remaining after the filtering is used to generate the predicate list of activities for the user, based on the current position of the user in the online game. The activities in the predicate list generated for the user is dynamically updated based on the changes detected in the current location of the user as the user progresses in the online game.

In some implementations, the game engine and instances of the game logic are distributed across a plurality of servers in different geo locations. The distributed game engine may process the game data generated by the game logic and the online interactions generated by the players at the respective geo locations, locally and in parallel, and synchronize the game data and the online interactions with other servers within the cloud gaming system 300. In this manner, the distributed game engine allows for faster and efficient processing of the game data and the online interactions. The game data that is output from the game logic and processed by the instances of the game engine are synchronized, assembled, encoded and streamed to different client devices for rendering, in response to users inputs provided during game play of the game. A synchronization engine within the game engine may be used to synchronize the distribution of the game data to the different servers for processing and manage the routing of the processed game data between the servers.

The distributed game engine may store the game play related data of all the games played by different players and users at different geo locations, in the telemetry data store 306 maintained at a central location, with the telemetry data store 306 storing game play related data for each online game separately. As the user plays an online game at the CGS 300, the game logic of the online game uses the user inputs provided by the user during game play to affect game state of the online game. The game state can be used to identify user attributes and characteristics of game activities attempted and game activities completed by the user. The game state of the online game can be available in a central location for the distributed game engine to use. The game state, in some implementations, may include game ID, game name, game characters, activity name, activity type, activity characteristics, game objects that were used or affected, game object attributes, game object state, graphic overlays, activity locations, activities attempted, activities completed, etc. The game state of a game may also include state of every device or module or system component of each of the servers within the network of servers that were used in the execution of the instances of the games and for communicating game data, wherein the states of device or module or system component may include states of CPU, GPU, memory, register values, program counter values, programmable DMA state, buffered data for the DMA, audio chip state, CD-ROM state, communication bandwidth used, communication bandwidth assigned, etc.

In addition to the game related data included in the game state, the game state may also provide information related to user saved data of the user playing the online game. For example, the user saved data for a user or a player may include user profile, user ID, user name, user avatar, user customizations to game objects, expertise level, type of player, amount of game tools/winnings/points/cash/awards won, user skill sets, amount of time taken to accomplish an activity, number of activities accomplished, number of attempts taken to complete the activity, etc. The game state may also include randomly generated features or AI overlays or game intricacies that are useful in understanding the game details associated with game play of the online game.

Additionally, the distributed game engine may interact with game titles data store 310, to retrieve game related data provided by different game title handlers, such as game developers, game promoters, game organizers, etc. The distributed game engine may store game titles and game logic of all the games that are available to users accessing the CGS 300, in the game titles data store 310. The game logic included in the game titles data store 310 can be used to execute game instances of a game at one or more data centers in different geo locations.

The generator engine 304 executing on a cloud gaming server 302 may retrieve the game play related data, such as processed online interactions, the game state of the online game, and characteristics of activities of the online game, etc., generated during game play sessions of the plurality of players, from the respective datastores and use the game play related data to create and train a predicate model used for providing assistance to a user to progress in the online game. The predicate model may be maintained on a first server and trained using the game play updates received from the different servers. Information provided in the predicate model is used to identify the current location of the user based on the activities the user has just completed and to provide assistance to the user by identifying the next activity the user has to attempt and accomplish to progress in the online game.

Figure 2:
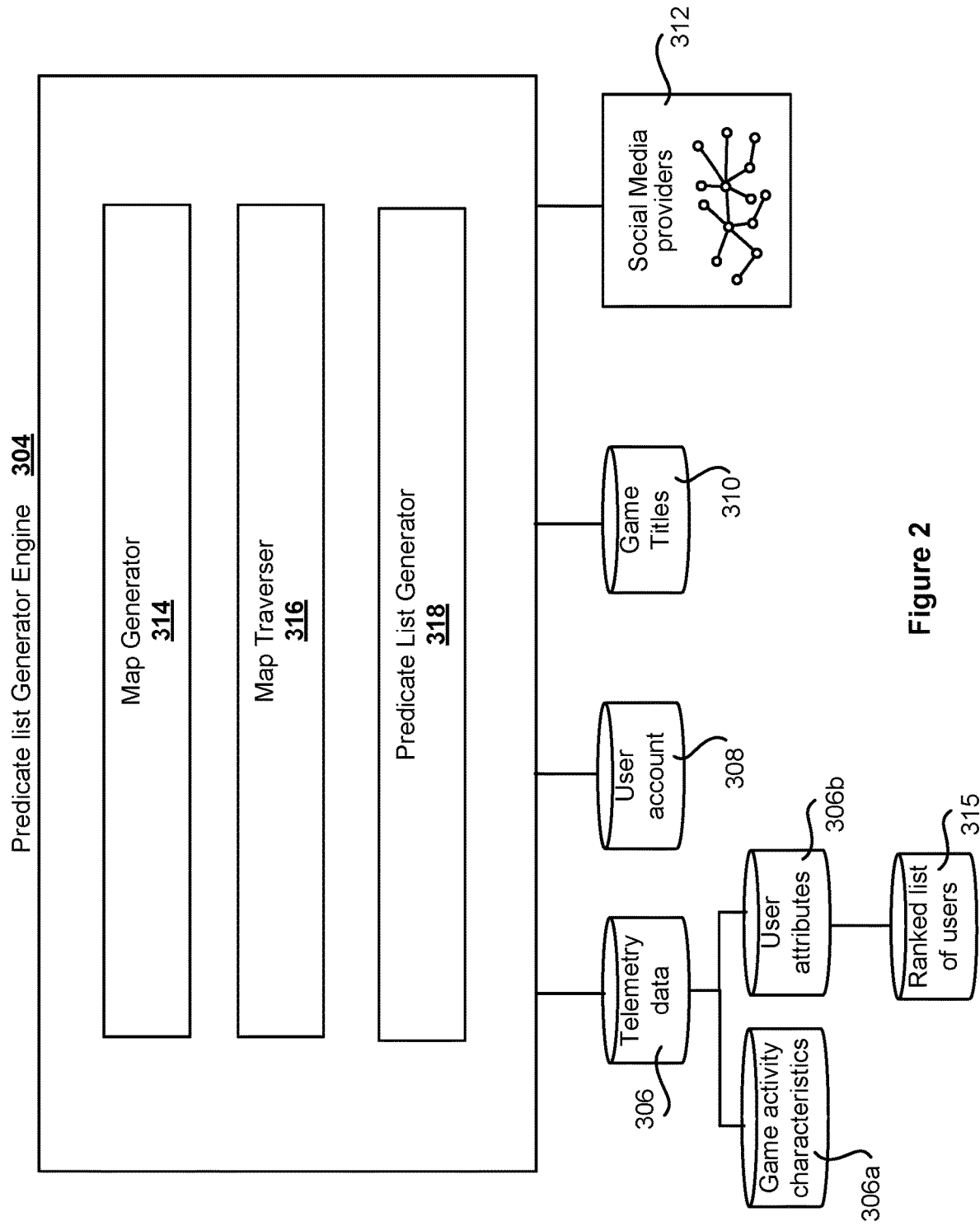
FIG. 2 illustrates a simplified block diagram of a predicate list generator engine executing within a cloud gaming server for providing assistance to a user during game play of an online game, in accordance with one implementation of the present disclosure.

FIG. 2 illustrates an overall view of an example generator engine used in providing predicate list to assist a user during game play of an online game, in one implementation. The generator engine 304 may be part of game logic or a separate engine that is executed by a cloud gaming server in the cloud gaming system. The generator engine 304 includes a plurality of code engines that are used to access telemetry data for the online game to generate an identity map of the online game identifying various vector points, traverse the map to identify activities and generate a predicate list to assist the user during game play. The telemetry data for the online game is maintained in a telemetry data store 306 and includes game play details gathered from game play sessions of a plurality of players. Broadly speaking the generator engine 304 includes, among other code engines, a map generator 314, a map traverser 316 and a predicate list generator 318.

The map generator 314 is used to generate the identity map of the online game identifying all the activities that are available for a player in the online game. The identity map may be generated as a 3D map identifying vector points representing all the activities available in the online game. A sample 3D map generated for the online game is shown and explained in full details with reference to FIG. 6A. The map generator 314 may also use telemetry data that includes various activities each of the players attempted, accomplished in their respective game play sessions of the online game to generate progression graphs of each player. The progression graph of a player is a sub-set of the 3D identity map generated for the online game and includes a subset of vector points identifying the activities that was accomplished by the respective player in the online game. The progression graphs generated for different players will be described in detail with reference to FIGS. 6B and 6C.

Continuing to refer to FIG. 2, in addition to the 3D map of the online game and the progression graphs for each individual player, the map generator 314 may use the telemetry data and data from the 3D map to generate and train a predicate model. Machine learning algorithm included in the map generator 314 may be used to generate the predicate model (i.e., an artificial intelligence (AI) model). The telemetry data is analyzed by the map generator 314 to identify user attributes of the players and the characteristics of the activities accomplished by the players. The characteristics of all the activities the players attempted, accomplished are stored in a game activity characteristics data store 306a and the user attributes of the players are stored in a user attributes data store 306b. The predicate model is generated by referring to the characteristics of the activities stored in the characteristics data store 306a and user attributes of the players stored in attributes data store 306b. The predicate model is built and trained to include the characteristics of the activities attempted, accomplished by each player, and user attributes of each player. Details provided in the predicate model may be used to determine the different routes taken by the different players, number of players that followed each route identified in the predicate model, number of players that attempted, accomplished the different activities, number of attempts for accomplishing each activity, etc. The predicate model is trained in real-time using the telemetry data collected from the different players as and when the map generator receives game play data from the players' game play of the online game.

When a user selects the online game for game play, the map traverser 316 of the generator engine 304 is used to traverse the 3D map of the online game to identify a vector point corresponding to a current location of the user and vector points associated with activities that are in the vicinity of the current location of the user. The activities in the vicinity may include activities from same level or different levels of the game, or be of same type or be of different types, etc. In addition to identifying the activities in the vicinity of the current location of the user, the map traverser 316 may include the necessary programming logic to analyze the characteristics of the identified activities and the user attributes of the user so as to only identify those activities that the user is eligible to perform.

The user, during game play of the online game, may specify a game objective that the user desires to achieve in the online game. The game objective may, in some instances, identify an activity or level that the user wants to accomplish. Responsive to receiving the game objective of the user, the map traverser 316 determines the game objective in the online game using in-game GPS, for example. The map traverser 316 then traverses the 3D map of the online game generated by the map generator 314 using information provided in the predicate model to identify activities that can be presented to the user to achieve their expressed game objective. The traversing may be done in a backward direction starting from a location of the game objective and moving toward the current location of the user to determine the routes taken by the different players. During backward traversal of the 3D map of the online game, the map traverser 316 may analyze the characteristics of the activities accomplished by the different players, the user attributes of the user, user attributes of the players that have accomplished the different activities in the online game, and the game objective of the user so that the activities that are identified match the skill set or capability of the user to enable the user to accomplish the game objective. In some instances, the game objective may, in addition to specifying an activity or level, may also specify how the user wants to achieve the game objective. For example, the game objective specified by the user may state that the user wants to reach a certain level or activity in the shortest possible time, or using the shortest path, or using the longest path, or by avoiding a particular route, etc. Alternately, the game objective may specify a route of a specific player to follow. The specific player may be a highly-skilled player, a player having same skill set as the user or a social contact of the user. The activities may be identified in accordance to the specifics provided in the game objective.

The predicate list generator 318 uses the activities identified by the map traverser 316 to generate a predicate list of activities for the user. As noted above, the activities may be activities that are in the vicinity of the current location of the user or activities that the user needs to perform to achieve the game objective. The predicate list identifies activities that the user is eligible to perform and a sequence in which the activities need to be performed to accomplish a particular activity or to generally progress in the online game. The predicate list may be provided in a table format or in a map format or any other format for rendering alongside the game data on a display screen (i.e., rendering surface) of a client device of the user used for interacting with the online game. The user may select an activity from the predicate list to play and the current location of the user is updated to the new location that corresponds with the selected activity. Based on the updated location of the user, the identity map of the user and the predicate list generated for the user are dynamically updated.

Figure 2A:
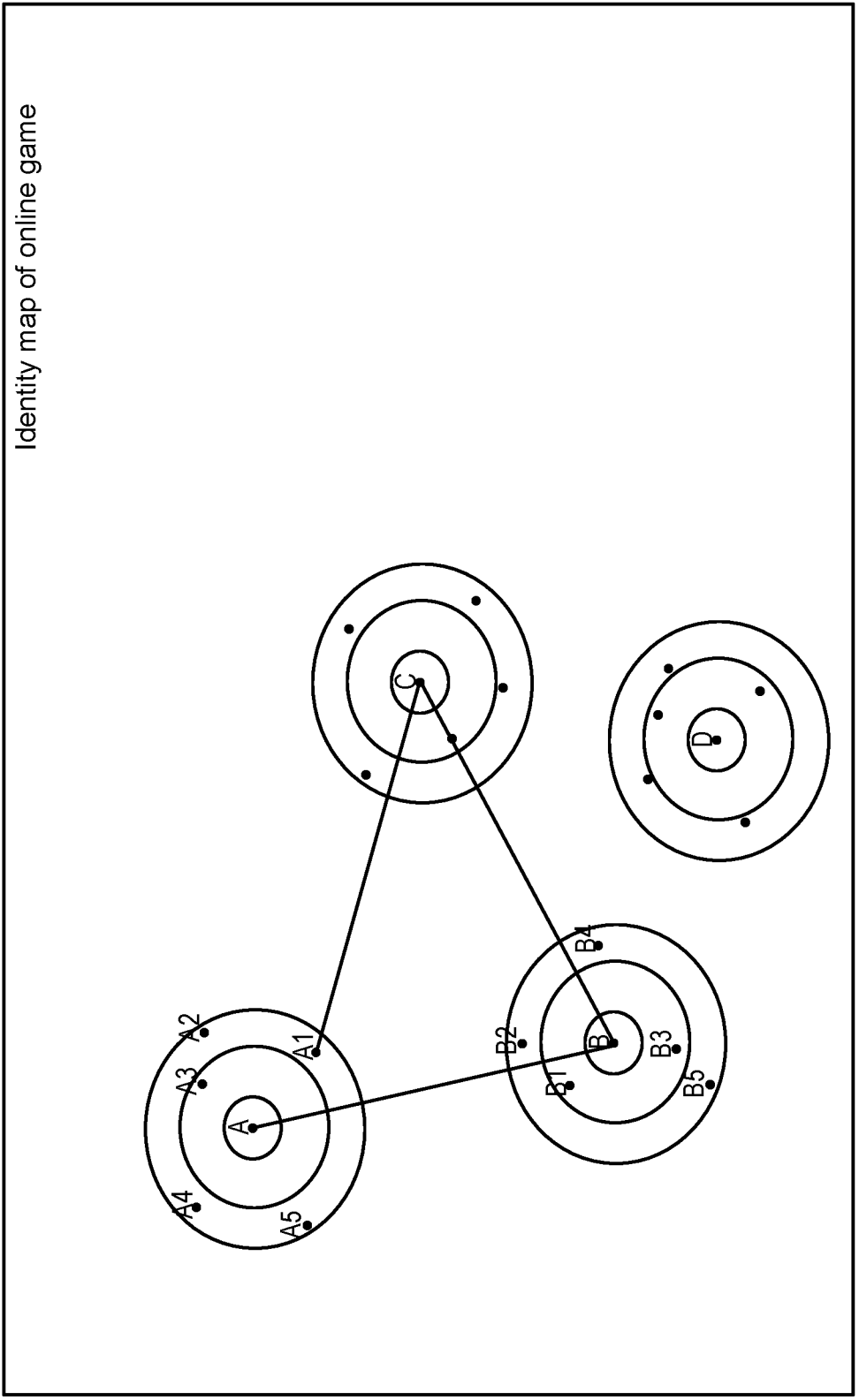
FIG. 2A illustrates views of predicate list of a user that is being dynamically updated as the user moves from one activity to another, in accordance with one implementation.

FIG. 2A shows an example of a user's progress in the online game and the various activities that are available to the user for progressing in the online game, in one implementation. The portion of the identity map shows a current location of the user at vector point A. The activity at vector point A may be a level 5 activity. The map traverser 316 may identify other vector points in the vicinity of vector point A (i.e., the user's current location) by traversing the 3D identity map. Thus, in the example illustrated in FIG. 2A, based on the traversal, the map traverser 316 may identify vector points A1-A5 in the vicinity of vector point A. Vector point A1 may be associated with an activity at level 10, vector point A2 may be associated with an activity at level 5, vector point A3 may be associated with an activity at level 6, vector point A4 may be associated with an activity at level 4 and vector point A5 may be associated with an activity at level 8. Based on the vector points identified by the map traverser 316, the predicate list generator 318 may generate the predicates for each activity associated with the corresponding vector point identified in the vicinity. The predicate list for all the activities identified in the vicinity of the user includes a list of other activities that need to be performed to accomplish the activity. The other activities listed for achieving an activity may be within the vicinity of the current location or may lead the user away from the current location. For example, for the activity associated with vector point A1, in the above example, wherein the activity is a level 10 activity, the user may be directed to complete activity associated with vector point B followed by activity associated with vector point C before directing the user to activity at vector point A1.

As the user selects the activity associated with vector point B, the predicate list for the user is dynamically updated to include activities that correspond with the activity at vector point B. These activities may include activities that need to be completed to achieve the activity at vector point B, and may also include activities associated with other vector points that are in the vicinity of vector point B. The updates to the predicate list may include additional activities in addition to the activity list for the activity associated with vector point A1. The user may perform the other activities that are required to achieve activity at vector point B. As the user completes the activity at vector point B, the user may be directed toward the activity associated with vector point C and once the user accomplishes the activity associated with vector point C, the user may be directed back to the activity associated with vector point A1. As the user progresses to the different activities, the predicate list is updated to include other activities related to the different activities the user has selected to accomplish. The predicate list as well as the predicate model of the user gets dynamically updated to include additional activities identified based on the changes to the current location the user.

Referring back to FIG. 2, as the user progresses in the online game, a progression graph may be generated for the user identifying the activities that the user has completed, an activity the user is currently engaged in, and activities that the user can complete to either progress or achieve game objective. This progression graph is dynamically updated as and when the map generator 314 detects a change in the current location of the user, and the map traverser 316 identifies additional or different activities based on the changed location of the user. The progression graph of the user may be presented to the user in a table format or a map format or as a list or as text. The map format provides a visual view of the current location of the user and the relative location of the activities that are available for the user to complete. The progression graph may be presented alongside the game data rendered at a user interface of the client device of the user used to access and play the online game. The user interface may be interactive and the user may be able to select an activity by interacting directly with the progression graph.

Figure 3:
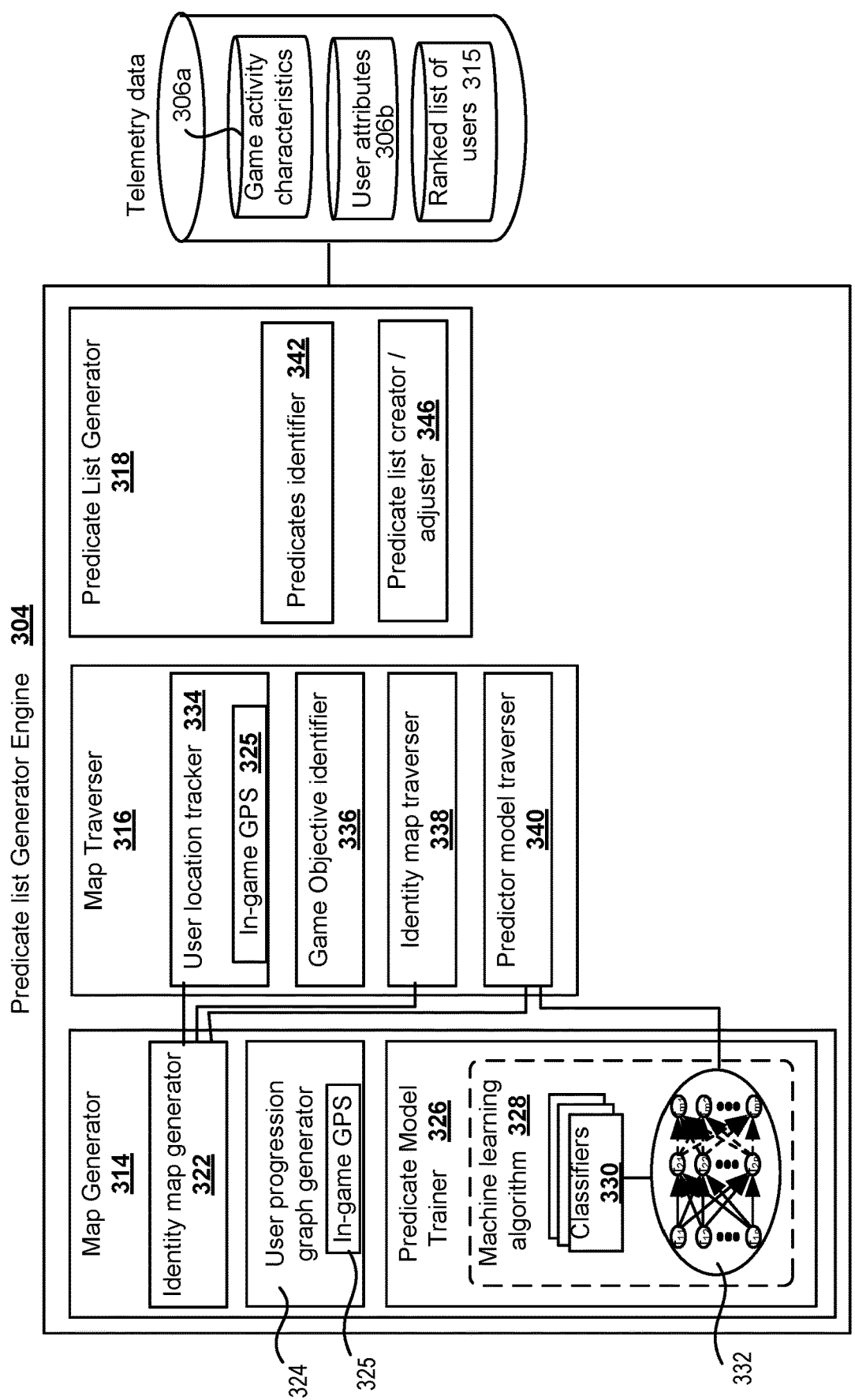
FIG. 3 illustrates a simplified block diagram of various code engines of the predicate list generator engine, in accordance with one implementation of the present disclosure.

FIG. 3 illustrates the various details of each of the logical codes/engines illustrated in FIG. 2. As mentioned with reference to FIG. 2, the predictor list generator engine 304 may be part of game engine that executes the game logic of the online game or may be a separate logic engine that has access to game related data generated for the online game. The generator engine 304 includes a map generator 314, a map traverser 316 and predicate list generator 318. To assist each of the logical engines to perform the function for which they are designed, a plurality of sub-logical engines may be defined within each logical or code engine. For example, the sub-logical engines within the map generator 314 may include an identity graph generator 322, a progression graph generator 324, and a predicate model trainer 326. The sub-logical engines within the map traverser 316 may include a user location tracker 334, a game objective identifier 336, an identity map traverser 338, and a predicate model traverser 340. The sub-logical engines within the predicate list generator 318 may include a predicates identifier 342 and a predicate list creator/adjuster 346.

The identity graph generator 322 within the map generator 314 may be used to generate an identity map of the online game that is available at the cloud gaming system. The identity map generator 322 maps the entire online game world to generate a 3D map, for example. The 3D map includes all the activities that are available within the online game. Each of the activities that can be performed in the online game is represented as a distinct vector point. Based on the game logic of the online game, the activities at different levels may be randomly distributed within the game world. For example, the activities from a particular level in the online game may be interspersed with other activities from other game levels. For instance, an activity from level 3 may be interspersed with activities from levels 7, 10, 12, etc. The 3D map of the online game identifies the various activities within the online game and the vector points provide details (i.e., characteristics) of the activities such as activity name, activity type, activity level, requirements for accessing the activity, requirements for completing the activity, etc. In alternate implementation, the identity map may be a two-dimensional map, with each activity represented as coordinate pair.

The progression graph generator 324 within the map generator 314 may be used to generate a plurality of progression graphs (i.e., progression maps) for different players, wherein each player has their own progression graph identifying their progress within the online game. As each player accesses and plays the online game, the inputs from the player and the game state of the online game (i.e., game related data of the player) defined by the game engine are collected as telemetry data and stored in telemetry data store 306. The telemetry data of each player may include characteristics of the activities accomplished by the player and user attributes of the player who attempted and accomplished the activities. The progression graph generator 324 uses in-game GPS available within the online game to keep track of the location of the player in the online game. The game inputs provided by the player are used to affect game outcome of the online game and to generate game related data. Portion of the game related data is processed, encoded, compressed and streamed to the corresponding client device of the respective player. The telemetry data is analyzed to identify details of each player's progress in the online game. For example, the telemetry data may provide information including the name of the player, game level of the player before attempting an activity, game skill possessed by the player, game winnings or game tools accumulated by the player, activities the player accessed in each location, activities the player accomplished, number of attempts to accomplish each activity, amount of time taken to accomplish the activity, the activity type, activity level, activity location, activity description, game level accomplished by the player after completion of each activity, etc. The details from the analysis of the telemetry data are used by the progression graph generator 324 to generate progression graph for each player. The progression graph generator 324 may use the telemetry data and the details from the identity map of the online game generated by the identity graph generator 322 to generate and populate the progression graph of each player. The progression graph provides details of the activities accomplished by the player within the online game.

When a user selects the online game and starts playing the online game, the progression graph generator 324 generates the progression graph for the user, and as the user completes the different activities, the progression graph of the user gets dynamically populated with the completed activities. The progression graph thus provides a current state of progress of the user in the online game. The progression graph may also be populated with activities that may be available for the user to accomplish next. The progression graph of the user may be presented to the user during his game play to visually show the user his current location in the online game and the activities that are available to the user.

The predicate model trainer 326 within the generator engine 304 engages a machine learning algorithm (having artificial intelligence) to generate a predicate model 332 that is used to identify activities for the user to assist the user during game play of the online game. The predicate model is initially generated using the telemetry data collected from a plurality of game play sessions of players that have played the online game. The generated predicate model is trained with additional game play data from game play sessions of players received over time. The predicate model may also be trained using current game play of the user. The generated predicate model is used to predict the route that is most optimal for the user to follow to achieve the game objective of the online game. The predicate model trainer identifies the activities that each player played in the online game by analyzing the telemetry data from the game play sessions of the plurality of players and uses the information to populate the various nodes in the predicate model so as to be able to map out the route that each player took in the online game.

Further, information provided in the predicate model may be used to identify characteristics of the activities completed by each player, the attributes of each player that completed each activity in the game and to identify additional attributes of the player, such as amount of time taken by the player to complete an activity, complete a level, complete a route, amount of game winnings obtained from completing the activity, number of players that completed the same route, frequency of selection of an activity on the route, etc. Additionally, characteristics of the node are also updated. For example, each node may be associated with a weight that is determined based on number of players that achieved the activity associated with that node, number of attempts taken to complete the activity, amount of time taken to complete the activity, etc. Based on the current location of the user and the relative weights of the activities in the predicate model, activities are identified for presenting to the user that are optimal for the user in accomplishing a game objective.

The machine learning algorithm engages classifier engines (i.e., classifiers) 330 to generate and train the predicate model 332. The classifiers 330 are used to populate various nodes within a network of interconnected nodes of the predicate model 332 wherein each node relates to an activity that can be performed in the online game. The inter-relationships between the activities represented in the nodes are established to understand the intricacies of the requirements (e.g., level, skill set, points, tools, etc.) for completing the different activities so as to understand the routes taken by the different players in the online game. The different routes follow different inter-relationship paths of the predicate model.

The classifiers are pre-defined to identify and classify specific game objectives in order to meet the overall game objective criteria for the online game. The classifiers that are used to build and train the predicate model, learn to identify the intricacies of the specific game objectives (e.g., shortest route to take to get to the activity identified in the game objective (if the game objective specifies a level or an activity in the online game), shortest time to get to the activity, longest route to take to get to the activity specified in the game objective, fastest time to complete the activity, etc.). The game objective may additionally state a specific player or specific type of player that the user may want to follow, specific type of activity that the user wants to complete, etc. The classifiers are programmed to determine the influence of these game objectives when identifying activities for the user. The classifiers analyze the telemetry data generated from the game play sessions of the plurality of players and use the results from the analysis to understand the intricacies of the game objectives to identify the activities. Accordingly, the activities are updated to the nodes within the layers of interconnected nodes, and the interconnected nodes are used to identify an output that meets the game objective criteria.

The predicate model identifies different routes the players took and to suggest one or more routes for the user to satisfy the different game objective criteria, wherein each route identified may be specific to satisfy a particular game objective criterion. The routes and the activities that are identified from the predicate model are specific for the user based on the user's current location and the game objective specified by the user.

The machine learning algorithm uses the characteristics of the various activities identified from the telemetry data as inputs to the nodes of the predicate model and progressively updates the nodes using details from the additional game play data received from game play sessions of the players over time. The updates to the predicate model are used to adjust the outputs (i.e., activities) to meet the game objective criteria. The updates to the nodes may be in the form of weights assigned to the various activities based on the number of players that completed the activity in the respective nodes, type of players that completed the activity, frequency of selection of the activity, etc. The machine learning algorithm uses reinforced learning to strengthen (i.e., train) the model by using the telemetry data from the initial online game sessions of the plurality of players to initially build the model, learn the intricacies of the inter-dependencies of the activities, and use the updates from additional game play sessions of the players received over time and updates from the current game play session of the user to reinforce the learning and strengthen the model. The strengthened model is used to adjust the list of activities (i.e., outputs) identified for the user to achieve the game objective. The adjusted list of activities identifies an optimal set of activities and an optimal route for the user to achieve the game objective.

Each classifier 330 is pre-defined to identify and classify specific ones of the game objective criterion identified from the game objective defined by the user. The classifiers are configured to classify the game objective criteria based on the activities completed by the players, tune the model with ongoing online interactions obtained from additional game play sessions obtained over time to determine how the game objective criterion influences the output identified for the user. The correlation between the game objective criteria and the activities identified for the user can be used to predict a route for the user to take to achieve the game objective.

In some implementations, the players may be ranked in accordance to their user attributes and the classifiers may be defined to include the ranking of the players when training the predicate model. In these implementations, the user attributes are used to generate a ranked list of players, which is stored in a ranked list of users data store 315 and used to train the predicate model. For example, a player with more expertise or more winnings or more skills or who has visited more places within the game world, for example, may be ranked higher than other players. Similarly, a player who is a social contact of a user may be ranked higher than other players.

The maps and model generated and trained by the various sub-engines of the map generator 314 are used to identify the activities for presenting to the user to assist the user in the online game. When a user accesses an online game available at a cloud gaming system 300 for game play, a game engine logic of the online game detects the user's request for game play of the online game and, in response, interacts with a user account data store 308 to verify the user ID of the user against a user profile of the user maintained in the user account data store 308 to ensure that the user is authorized to access the cloud gaming system, and with a game title data store 310 to verify that the user is authorized to access the online game for game play. The verified user is allowed to access and play the online game.

As the user plays the online game, the user location is tracked within the online game. A user location tracker 334 within the map traverser 316 uses in-game GPS 325 to track the current location of the user within the 3D identity map of the online game generated by the identity map generator 322. The in-game GPS identifies the current location as a vector point that is associated with an activity that the user just completed. The current location of the user is used by the map traverser 316 along with the identity map and the predicate model generated and trained by various sub-engines of the map generator 314 to identify the activities for the user. The data from the identity map and the predicate model may be used in one of two different modes.

In the first mode, an identity map traverser 338 within the map traverser 316 is used to traverse the 3D identity map of the online game, based on the current location of the user, to identify activities that are in the vicinity of the current location of the user. Depending on how the game logic has defined the game world, the activities that are in the vicinity of the current location of the user may be from the same level as the activity at the current location that the user just completed or may be from a different level (e.g., higher level or lower level than the level of the activity at the current location), or may be of the same type or different type (e.g., an activity type that allows a user to accumulate game points or game winnings or tools, or an activity type that may be used to destroy a structure or build a structure, etc.). Irrespective of the type or level of the activities in the vicinity of the user's current location, a predicate list is generated identifying predicates to complete each of the identified activities. The predicates for each activity in the vicinity may identify other activities that have to be completed in order to complete the identified activity. The other activities may be in the vicinity of the current location or may be away from the current location of the user. Activities identified by the identity map traverser 338 are provided to the predicates identifier 342 of the predicate list generator 318 to generate the predicate list for the user.

In the second mode, the map traverser 316 may use a predicate model traverser 340 to identify the activities for providing to the user. In this mode, the user may specify a game objective that the user desires to achieve during the current game session of the online game. The game objective may identify activity characteristics and/or user attributes of a player. For example, the game objective may specify game characteristics, such as an activity type or activity location or activity level that the user desires to achieve. Alternately or additionally, the game objective may identify user attributes, such as a specific player to follow, a specific level of player to follow, specific type of player to follow, or specific route to follow, etc. Based on the game objective specified by the user, the predicate model traverser 340 is used to traverse the identity map in a backward direction using information provided in the predicate model to identify the activities for recommending to the user. It should be noted that the predicate model 332 has been trained using classifiers for the different game objectives (e.g., popularity of the activities based on number of players that have attempted each activity, routes that are shorter in length, routes that are faster to complete, routes that allow a user to cover large area of the game world, routes that are slower to complete, routes followed by specific type of player (e.g., players of a certain level (expert or novice) or players who are social contacts, etc.). The backward traversal of the identity map is performed from a vector point that corresponds with the location of the game objective (if the game objective specifies an activity or level or location in the game) to the vector point that corresponds with the current location of the user to identify all the activities that different players completed between the current location and the game objective location. Relative ranking of the player obtained from the ranked list of uses 315 or the player preference specified in the game objective may be used to identify the activities. The defined number of activities identified for the user is pre-determined from the predicate model and provides an estimate of a distance (i.e., number of activities or amount of distance) that the user has to travel from the current location to the location defining the game objective.

Activities identified by the map traverser 316 are provided as input to the predicate list generator 318. A predicate identifier 342 within the predicate list generator 318 uses the activities identified for each of the different modes of operation of the map traverser 316 and determines a sequence for completing the identified activities. In some implementations, the sequence may be based on the user attributes of the players whose activities have been selected. The relative ranking of the players, for example, may be based on some pre-defined ranking criteria and stored in the ranked list of users 315. The pre-defined ranking criteria may specify that players who are social contacts of the user or players of specific skill level be ranked higher than other players. The generator engine 304 may interact with social media providers 312 through appropriate APIs to obtain the social graph of the user in order to determine the social contacts of the user. Similarly, players who are at certain expert level may be ranked higher than other players. The relative ranking of the players and/or the relative ranking of the user attributes of the players are used by the predicates identifier 342 to determine the sequence of the activities identified for the user to assist the user in the online game play.

The activities identified for the user and the sequence determined by the predicates identifier 342 are used as inputs to the predicate list creator/adjuster 346. The predicates list creator/adjuster 346 generates the predicate list for the user. The predicate list identifies the sequence in which the identified activities need to be performed by the user or that was followed by a specific player in order to achieve the game objective or progress in the game. As the user selects an activity identified in the predicate list to complete, the user location tracker 334 detects a change in the current location of the user and sends a signal to the identity map traverser 338 and the predicate model traverser 340 to update the list of activities identified for the user based on the change in the current location. Responsively, the predicate list creator/adjuster 346 dynamically updates the predicate list generated for the user to include additional activities or a new set of activities. The changes to the current location are also updated to the progression graph generated for the user.

The various implementations described herein show ways of keeping track of the current location of the user during game play of the online game and providing a dynamically updated list of activities for the user to perform to progress in the online game. As there are multiple directions that a user can take to progress in the game, performing a depth-first traversal would allow the generator engine 304 to examine the game play of the plurality of players, determine the experience of the players as they accessed and completed the various activities and use the previous players' game play experience to provide suggestions to the user to complete his game objective. Information from the depth-first traversal is synthesized to identify the attributes of the previous players, determine how the attributes of the previous players stacks up against the attributes of the user and any game objective specified by the user, so as to identify and recommend a set of activities that the user is capable of completing. As the attributes of the user are constantly being updated based on their progress in the online game, the generator engine is capable of keeping track of current attributes of the user, the current state of user's game play (i.e., the current location of the user), and dynamically updating the predicate model for the online game, so as to recommend an appropriate list of activities for the user to attempt and complete.

In addition to the list of activities and the sequence of completing the activities, the predicate list may also include user attributes of the players that completed each of the activities in the predicate list and provide additional information that are generated from the user attributes of the players. Some example user attributes that may be provided in the predicate list may include an amount of time taken by the players to complete the activity, number of players that completed the activity in that amount of time, skill level and game level of the players that attempted and completed the task, amount of game winnings that the user can expect to win upon completing the activity, and additional information, such as an estimate time of completing the activities in the predicate list, to name a few. The predicate model is sufficiently trained with the game play experience of the players to enable the generator engine to continuously keep track of the user's location in the game and dynamically adjust the activities that match the user's objectives in order to enhance the game play experience of the user.

As the online game can be very complex and include multiple activities within each level and multiple levels within the game, wading through the different levels can become very hard and confusing for the user. As a result, the user may get lost in the game intricacies and lose interest in the game. The various embodiments described herein allow the user to have satisfying game play experience by allowing the user to specify the type of game play experience that they desire, and matching the user's desires with prior players' game experience to identify and recommend the activities from prior players game play to enable the user to have similar or better game play experience as that of the prior players. The user may review the list of activities presented and may select an activity over other activities in order to improve their position in the game or to better position themselves to achieving a game objective. For example, the user may select an activity provided in the predicate list or may select any other activity in the online game to complete. The other activity may be to gain additional tools or winnings or points that may be needed to complete some of the activities within the predicate list or may be to improve the user's overall position in the game. As the user selects and completes an activity, the predicate list gets automatically updated based on the current state (i.e., location) of the user. The predicate list may be used as a guide to know what activities can be attempted next or may be used to determine purpose of each activity.

Figures 1, 2, 4A:
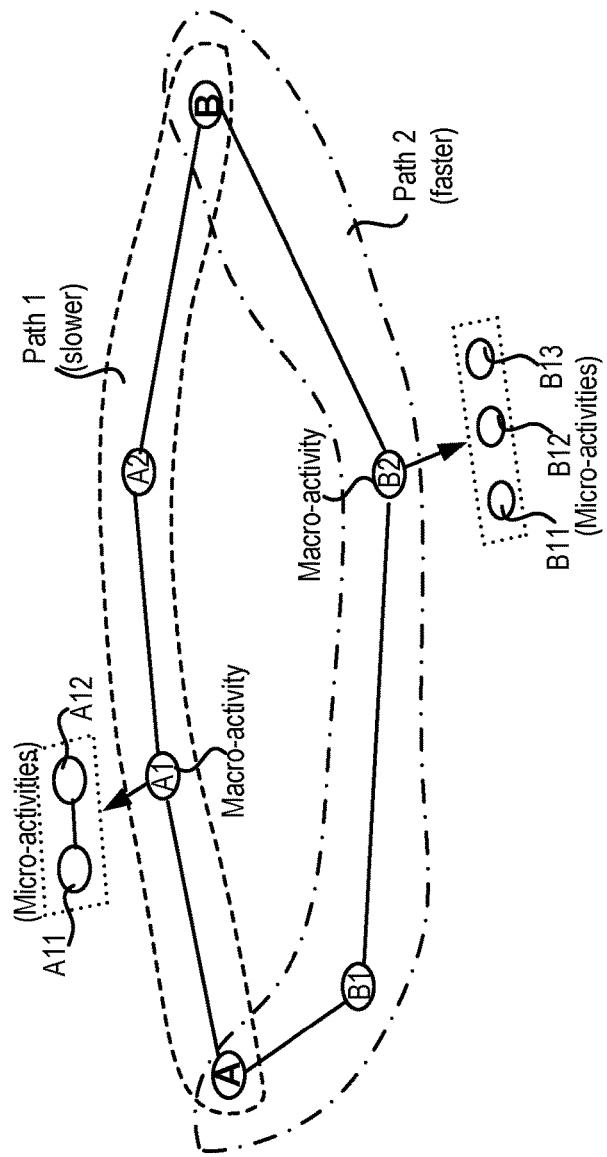
FIG. 4A (4A-1, 4A-2) illustrates an example of a simple activity view identifying two different routes taken by two different prior players in traversing from a first activity to a second activity within the online game, the activity view determined from analyzing telemetry data of the two prior players, in accordance with one implementation of the present disclosure.
Figures 1, 2, 4B:
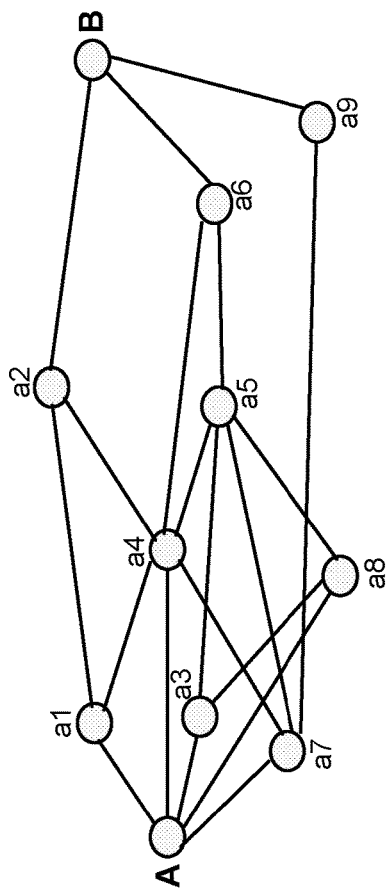
FIG. 4B (4B-1, 4B-2) illustrates an example activity view identifying various routes taken by different prior players when travelling from a first activity to a second activity within the online game obtained by analyzing telemetry data of the prior players, in accordance with one implementation of the present disclosure.

FIGS. 4A and 4B illustrate examples of various paths taken by different players that have played the online game and the activity view that is generated for a user playing the online game that is based on the different players paths. FIG. 4A illustrates a simple example of paths followed by two players as they progress from vector point A to vector point B and FIG. 4B illustrates the paths followed by a plurality of players. FIG. 4A-1 shows a slower path 1 followed by player 1. The slower path 1 includes activities associated with vector points A1 and A2 while traveling from vector point A to vector point B. Some of the activities in the online game may be macro activities, in that they may be made of a plurality of micro activities. In FIG. 4A-1, activity associated with vector point A1 is shown to be a macro activity and includes two micro activities A11 and A12. Similarly, player 2 follows a faster path 2 by performing activities associated with vector points B1 and B2 while traveling from vector point A to vector point B. Vector point B2 is shown to be a macro activity with 3 micro activities (B21, B22 and B23) included within it. The macro activities may be identified using an indicator. An example macro activity indicator is shown in table shown in FIG. 4A-2 by an "*" mark. Other ways of indicating a macro-activity can also be employed. The activities completed by player 1 and player 2 following the two different paths (path 1, path 2) are shown in map format in FIG. 4A-1 and in a table format in FIG. 4A-2. Player 1 and player 2 may be social contacts of the user, which may be specified in the game objective (e.g., include activities of social contacts). As a result, the predicate list may include activities identified from game play of the social contacts.

FIG. 4B illustrates the various routes that were taken by players 1-9, with each route being distinct from the others. The activity view generated shows the distinct routes taken by each of players 1-9. Each player in FIG. 4B is shown to traverse from vector point A to vector point B along different paths and these paths are shown in map format in FIG. 4B-1 and the activity view is shown in table format in FIG. 4B-2. For example, the activity view may identify player 1's path to include vector points A, a1, a2, B; player 2's path to include vector points A, a3, a5, a6, B; player 3's path to include A, a1, a4, a2, B; and so on. Either the map format or the table format may be rendered alongside the game play for the user. Based on the game objectives expressed by the player and/or ranking of the players and/or activity selection criteria pre-defined for the online game or based on number of players that have followed the specific routes, the activity route of specific player may be selected for presenting to the user. The activities selected for the user may be presented on an interactive user interface on a display screen of a client device used by the user to interact with the online game. The activities may be presented in tabular format or in map format or in text format or any other format that may be appropriate for rendering on the display screen.

FIG. 5 illustrates an example predicate list that may be presented to the user based on game objective specified by the user, in one implementation. FIG. 5 shows the various routes that different players or friends or social contacts of a user followed from vector point A to vector point B with one or more of the vector points shown as being a macro activity that is associated with a plurality of micro-activities, while the remaining vector points are shown as being single activity. The predicate list may identify the various activities and predicates for each activity. In FIG. 5, the predicate list is provided in a table format, although other formats can also be envisioned. The predicate list may include activities, user attributes and/or activity characteristics. In the example illustrated in FIG. 5, friend/player A's path is shown to include vector points a, a1, a2 and b and take 7 minutes to complete; friend/player B's path is shown to include vector points a, a3, a4, a5 and b and take 12 minutes to complete; friend/player C's path is shown to include vector points a, a6, a7 and b and take about 4 minutes to complete; and friend/player D's path is shown to include vector points a, a6, a3, a4, a7, a5 and b and take about 17 minutes to complete. It should be noted that not all shortest routes take less time and not all long routes taken too much time. In some cases, the shortest route may take longer time while the longest route may not take the longest time to complete. In this example, the selection of the activities for presenting to the user may be based on game objective specified by the user. Thus, when the game objective of user specifies fastest way to reach vector point B, the predicate list that may be provided to the user may be friend/player C's path, which takes about 4 minutes to complete. Similarly if the game objective of the user specifies that the user would like to perform as many activities as possible or visit as many places in the game world as possible, then the predicate list that may be provided to the user may be of friend/player D's path. Although in the example illustrated in FIG. 5, all the activities from a specific player's path has been identified for the user, it should be noted that the predicate list recommended to the user does not have to specify all the activities from a specific player's path. The predicate list may include a combination of activities from different players' paths and the relative weight of the activities identified in the nodes of the predicate model may be used to identify the activities for the user.

Figure 6B:
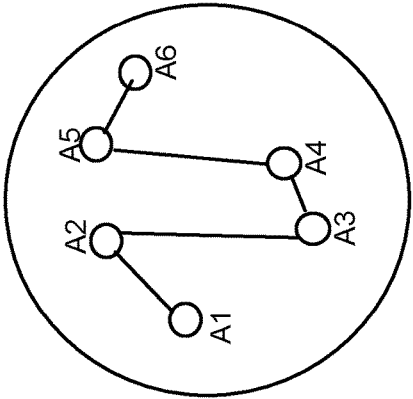
FIGS. 6A-6C illustrates an example identity map of the online game and examples of progression graphs of different players generated using the identity map of the online game, in accordance with one implementation.
Figure 6C:
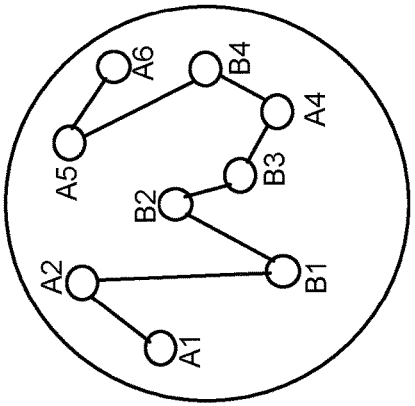
Figure 6A:
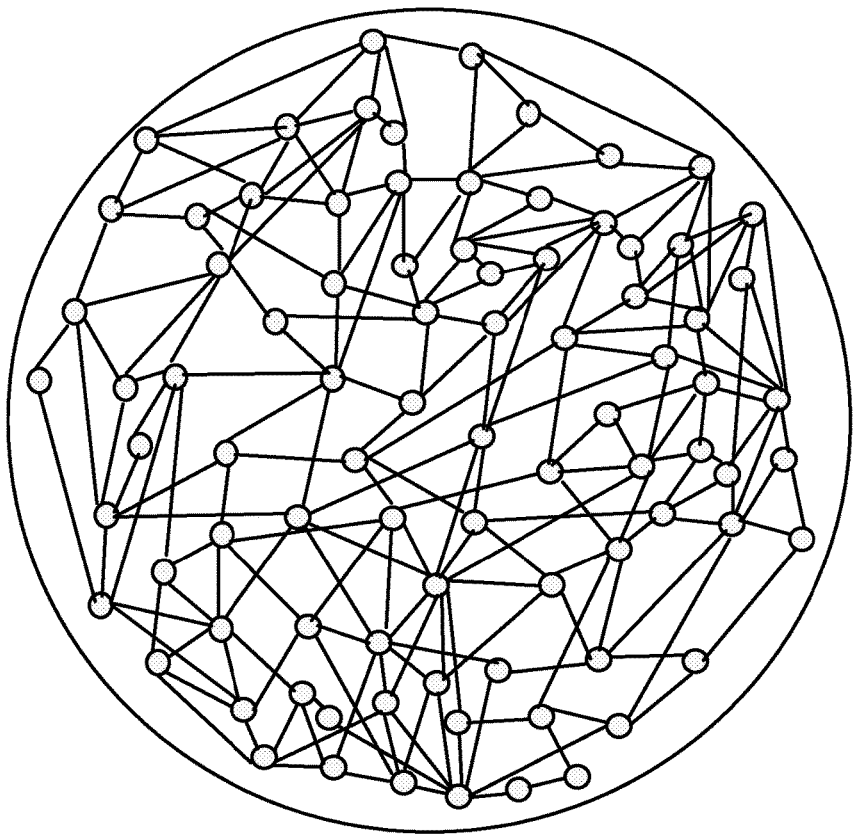

FIGS. 6A-6C illustrate sample identity map generated for the online game and the progression graphs generated for two players P1 and P2, respectively. The identity map for the online game is generated by the map generator 314 within the generator engine 304 and includes all activities defined in the online game. The activities may be defined in different regions (e.g., countries, states, galaxies, universes, or geographies) and are not restricted to a small area. The identity map is generated as a 3D map with each point (represented as circle) in the identity map represented as a vector point for an activity that is available for a player. The lines between two vector points may represent a sequence or route that can be followed by different players.

FIGS. 6B and 6C illustrate sample progression graphs of two players that played the online game. The progression graph includes a portion of activities that are included in the 3D map and so the progression graph of a player is a sub-set of the identity map of the online game. The map generator 314 uses the telemetry data collected from the two players game play sessions to identify activities each of the players accomplished in their respective game play sessions and to populate the progression graph of the respective player. FIG. 6B illustrates a route followed by player P1 as player P1 progressed from vector point A1 to vector point A6. Similarly, FIG. 6C illustrates a route followed by player P2 as player P2 progressed from vector point A1 to vector point A6. As can be seen, some of the activities accomplished by player P2 may be different from those accomplished by player P1, while some other activities may be common. For instance, player P2 may have attempted activities associated with vector points B1-B3 after completing activity associated with vector point A2 and before attempting activity associated with vector point A4. Similarly, player P2 may have accomplished activity associated with vector point B4 after completing activity associated with vector point A4 and before accomplishing activities associated with vector points A5 and A6. Thus, the progression graph shows the two different routes followed by the two players P1, P2 even though they started from the same starting vector point A1 and ended at the same ending vector point A6. Player P2 may have taken the different route as they may have wanted to accomplish more activities, or gain additional tools or points or levels, or based on the skill set possessed by player P2, etc.

Figure 7A:
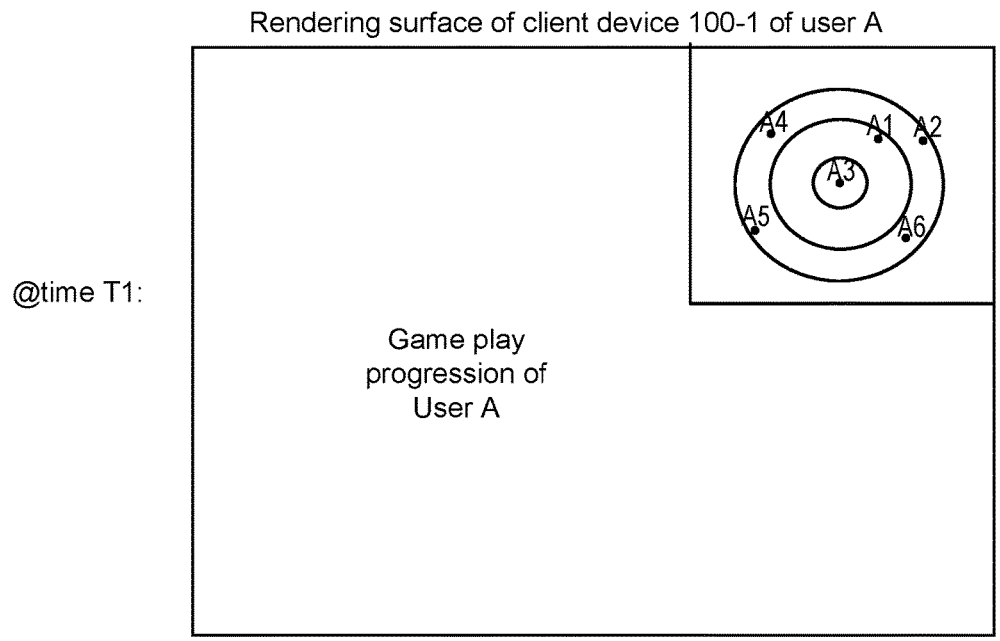

FIGS. 7A-7E illustrates the various formats a predicate list generated for a user can be presented and the dynamic nature of the predicate list, in one implementation. The predicate list may be presented as an interactive user interface on a display screen of a client device of a user. User can select and complete an activity from the predicate list. The predicate list includes predicates for a plurality of activities with each activity having a set of predicates that need to be completed to reach or access or complete the activity. As shown in FIG. 7A, the game data is provided by cloud gaming system for rendering on a rendering surface of a client device at time T1. The game data shows player A's progression in the online game and the current location of player A in the online game. Based on the current location and the progression of player A in the online game, a predicate list is generated for player A and presented on the rendering surface alongside the game data. The predicate list is provided in map format.

Figure 7B:
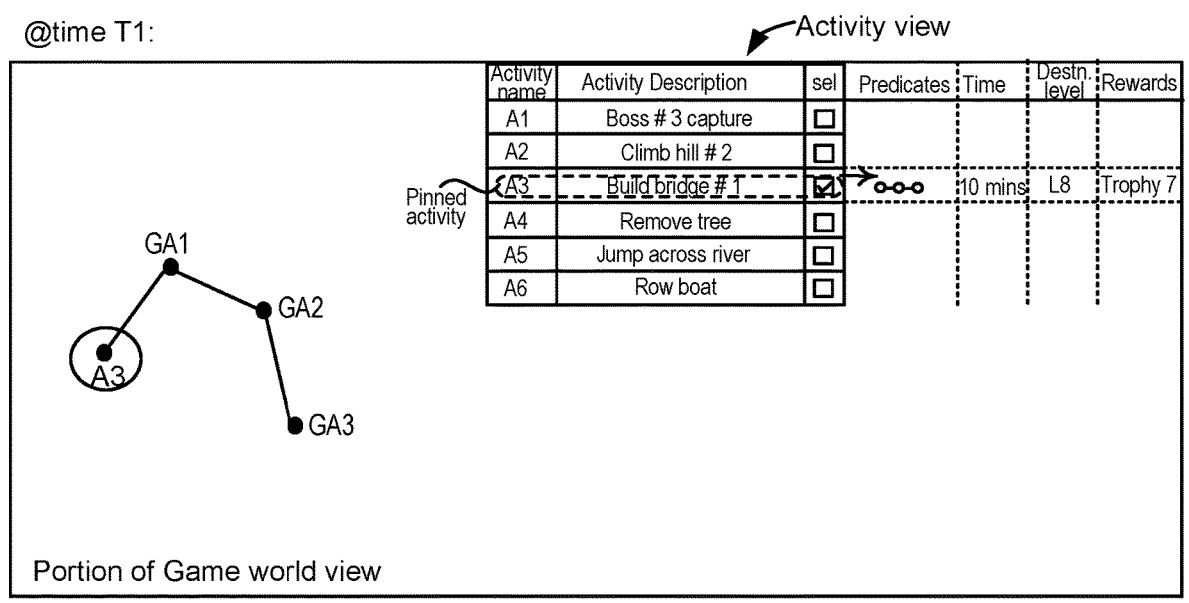

In an alternate implementation shown in FIG. 7B, the predicate list may be presented in a table format. FIG. 7B illustrates the current location of the user represented by vector point A3. User selection of the activity at vector point A3 for completing may result in the predicates of activity associated with vector point A3 being presented in the main portion of the rendering surface of the client device of the user. The predicates identify other game activities GA1-GA3 that need to be performed in order to complete the activity associated with vector point A3. In addition to presenting the activity associated with the vector A3 and its related activities, a predicate list is presented in table format in the upper right corner of the rendering surface. The predicate list provides an activity view of all the activities available in the vicinity of vector point A3. The interactive capability of the predicate list rendered on the rendering surface allows the user to "pin" an activity that the user wants to follow. Pinning of the activity allows the user to follow the predicates in order to complete the activity, wherein the activities identified in the predicates may cause the user to move further away from the current location. As the user proceeds to perform the related activities identified in the predicates for vector point A3, the current location of the user changes to a location that corresponds to the activity the user is currently attempting to complete. The changes to the current location triggers a dynamic update to the activities in the predicate list so that activities that are in the vicinity of the user's new location is presented to the user in addition to the predicates of the current activity. The user may complete the activity identified in the predicates of vector point A3 and the pinning would provide the user access to the next activity in the predicates for vector point A3 even when the user's current location is not in the vicinity of vector point A3. The pinning thus ensures that the predicates for vector point A3 remains in the predicate list presented to the user while allowing dynamic update of other activities in the predicate list to include activities that pertain to the user's new location. The dynamic update may allow the user to wander away from the route defined by the predicates of the selected activity A3 yet give the ability for the user to return to the predicates of the selected activity A3 to complete. The user does not have to complete the predicates and may select to form his own path in the online game. In such cases, the dynamic updating of the predicate list will assist the user by showing the activities that the user can select and complete in the new location.

The table view of the predicate list shown in FIG. 7B is a dynamically expandable view, in that when the user selects the predicates of vector point A3 to follow, the particular row may expand to show additional details, such as the list of activities included as predicates to vector point A3, an estimate of time needed to complete the activities in the predicates, the level that the user will be once the user completes the predicates for the activity associated with vector point A3, game winnings that the user may win in the game by following the predicates, etc. In addition to the above list, attributes of players that completed the activities in the predicates may also be presented, such as number of players that completed each of the activities, expertise level of the players, number of attempts to complete each activity, player identity (e.g., the player is a social contact of the user or a game player), etc.

FIG. 7C illustrates an alternate activity view of predicates at time T1 presented to the user for an activity in the current location of the user, in one implementation. When the user selects or pins the activity that the user wants to follow, a row of the table shown in FIG. 7B identifying the predicates is presented to the user, instead of a complete table of activities. The current location of the user in the online game is identified from in-game GPS and the predicates for the activity related to vector point A3 is presented to the user. The predicates for activity of vector point A3 is similar to what was shown in FIG. 7B.

When the user selects game activity GA1 from the predicates, the user may be taken to a new location corresponding to game activity GA1 to allow the user to complete the game activity. In response to detecting the change in the current location of the user, the predicate list is dynamically updated. FIG. 7D illustrates one example illustration of an updated predicates for the pinned activity related to vector point A3 at time T2 when the user selected the game activity GA1 for completing. The predicates shown in FIG. 7D have been updated from what was shown in FIG. 7C based on the game activity GA1 that the user has selected and completed. As shown, the remaining activities in the predicates include GA2 and GA3 and the estimated time to complete these activities is shown to be about 6 minutes.

FIG. 7E illustrates the updated predicate list generated for the user in response to detecting a change in the user's current location in the online game, in one implementation. When the user selects game activity GA1 from the predicates identified for the activity corresponding to vector point A3, the game play data corresponding to selected game activity GA1 is rendered in the main portion of the rendering surface of the client device of the user and the activity view shown in table format in FIG. 7B is updated to reflect the activities that are appropriate for the new location of the user. The updated predicate list continues to present the pinned activity corresponding to vector point A3 along with the other activities. The user may continue with the pinned activity or select other activities in the vicinity of an activity from the predicates for vector point A3, or any other activity in the predicate list and the predicate list will be dynamically updated to include activities that are appropriate to the user's location. The generator engine keeps track of the user's location within the online game and dynamically updates the predicate list, the predicate model and the progression graph of the user to include activities corresponding to the user's location in the online game. It should be noted that more than one activity can be pinned and the predicate list is updated to show the predicates for the different pinned activities.

When a new game is introduced in the cloud gaming system, there will be no telemetry data available. As a result, the predicate list will not include any activities as there is no predicate model that is generated yet for the new game. As players begin to play the online game, the telemetry data for the new game begins to build up and the predicate model is generated and trained with the telemetry data from the players game play data.

The generator engine 304 may use the telemetry data of the plurality of players to build and train the predicate model, which is used for identifying the activities for a user. However, the generator engine 304 may not share the details of all the activities that each player attempted and accomplished, with a user. This may be to avoid letting the user know what activities are where and to avoid spoiler alert.

Figure 8:
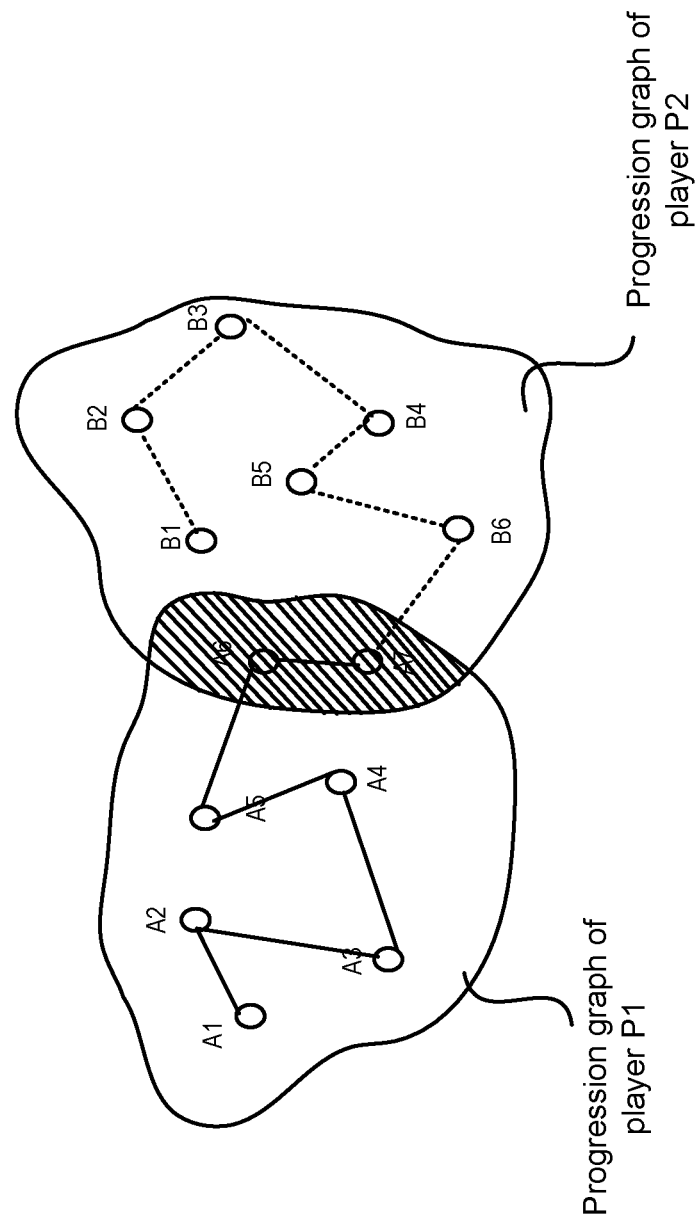
FIG. 8 illustrates a simplified view of an identity map of an online game identifying progression graphs of players one and two that are used to prevent spoiler alerts, in accordance with one implementation.

FIG. 8 illustrates one such example of progression graphs of two players within an identity map of the game. In the example shown in FIG. 8, player P1 is shown to have accomplished activities A1-A7 and player P2 is shown to have accomplished activities A6-A7, and B1-B6. Activities A6 and A7 are shown to have been accomplished by both players. The progression graphs generated for players P1 and P2 include the activities accomplished by the respective players and the paths followed by the players P1 and P2. In this example, the progression graph of player A is not shared with player B and vice versa. This may be to avoid spoiler alert so that an element of surprise is maintained for the players, users attempting the activities in the online game. The activities accomplished by player P1 may be used to generate the predicate list for player P2, if player P1 had played the online game before player P2 or the activities accomplished by player P2 may be used to generate the predicate list for player P1, if player P2 had played the online game before player P1.

Figure 9:
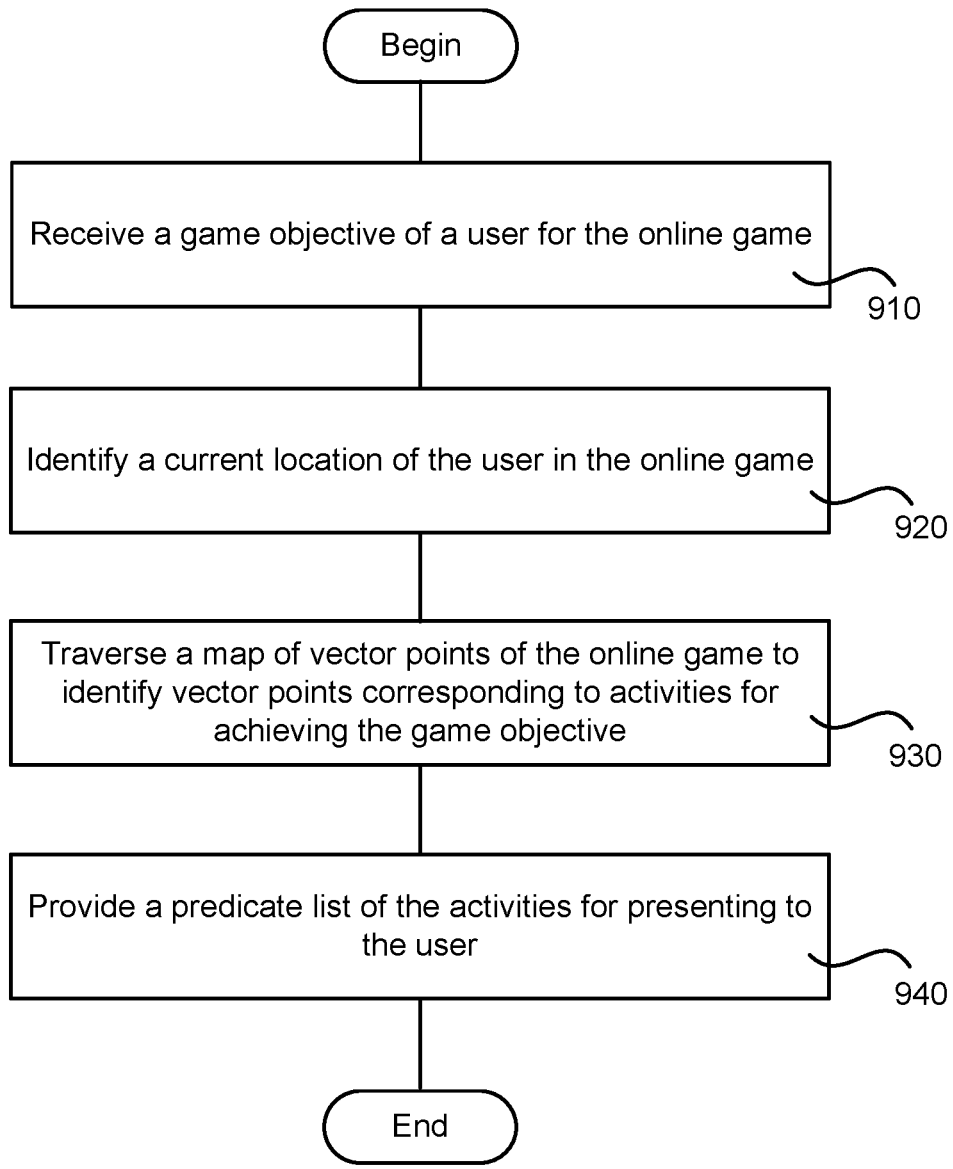
FIG. 9 illustrates flow operations of a method for providing hints for an online game, in accordance with one implementation of the present disclosure.

FIG. 9 illustrates a sample operations flow of a method for providing assistance to a user during game ply of an online game, in accordance with one implementation. The method begins at operation 910 when a game objective specified by a user for the online game is received at the generator engine. The game objective may specify an activity or a level or a location in the online game the user desires to reach in a current game play session. The game objective may include the type of player or a specific player or type of game play the user desires to follow. A current location of the user in the game is identified, in operation 920. The current location of the user may be detected using in-game GPS. The in-game location may be identified from a map of the online game generated by the generator engine. The map may be a three dimensional (3D) map and identify details of the different terrains included in the online game. The current location of the user may be identified as a vector point in the 3D map.

The generator engine then traverses the 3D map of vector points in a backward direction from a vector point that identifies the game objective to a vector point that corresponds with the current location of the user, as illustrated in operation 930. The backward traversal may be performed using information provided in a predicate model and is performed to identify vector points corresponding to activities performed by a plurality of players who have achieved the game objective specified by the user. Each vector point corresponds to an activity that can be performed in the online game. The online game may identify a plurality of directions that a user can proceed in the online game to achieve the game objective and the user can easily get lost trying to choose a direction for achieving the game objective. In order to assist the user in achieving the game objective, the generator engine relies on the game play of a plurality of players that have already played the online game and achieved the game objective. The generator engine builds the predicate model and trains the predicate model with game play information from the plurality of players. The predicate model identifies the different routes the plurality of players took starting from the current location to the game objective location. The generator engine uses the details from the predicate model to provide activities/route suggestion to the user to achieve the game objective. The traversal assists in narrowing the number of directional choices for proceeding in the online game to a set of tried and tested routes followed by plurality of players. The vector points of the activities achieved by the plurality of players along the different routes are identified.

A predicate list is generated for the user, as illustrated in operation 940. The predicate list identifies activities corresponding to the vector points identified along the different routes, and a sequence in which the activities need to be performed by the user to achieve the game objective. The predicate list may identify predicates (i.e., list of activities) for each route that has been identified for the user, wherein each route may satisfy specific portion of the game objective. The user can select any one of the activities from the predicate list and follow the activities identified in the predicates of that activity to achieve the game objective.

The generator engine can be provided in software, hardware, firmware, or any combination thereof. The generator engine is configured to use the identity map of the online game to track a current location of a user in the online game while the user is playing the game, the game play details from game play sessions of a plurality of players to identify activities for a user to follow, and present a predicate list to the user. The predicate list identifies activities and respective predicates to achieve each activity identified in the predicate list. The activities that are identified are activities that have already been achieved by other players as they navigated the various paths (i.e., routes) of the online game. The generator engine allows the user to explore the game in a way that is comfortable to the user, as the activities identified in the predicate list take into account the user's game playing skills and matching them against the attributes of the prior players that have played the game and achieved the game objective specified by the user.

Figure 10:
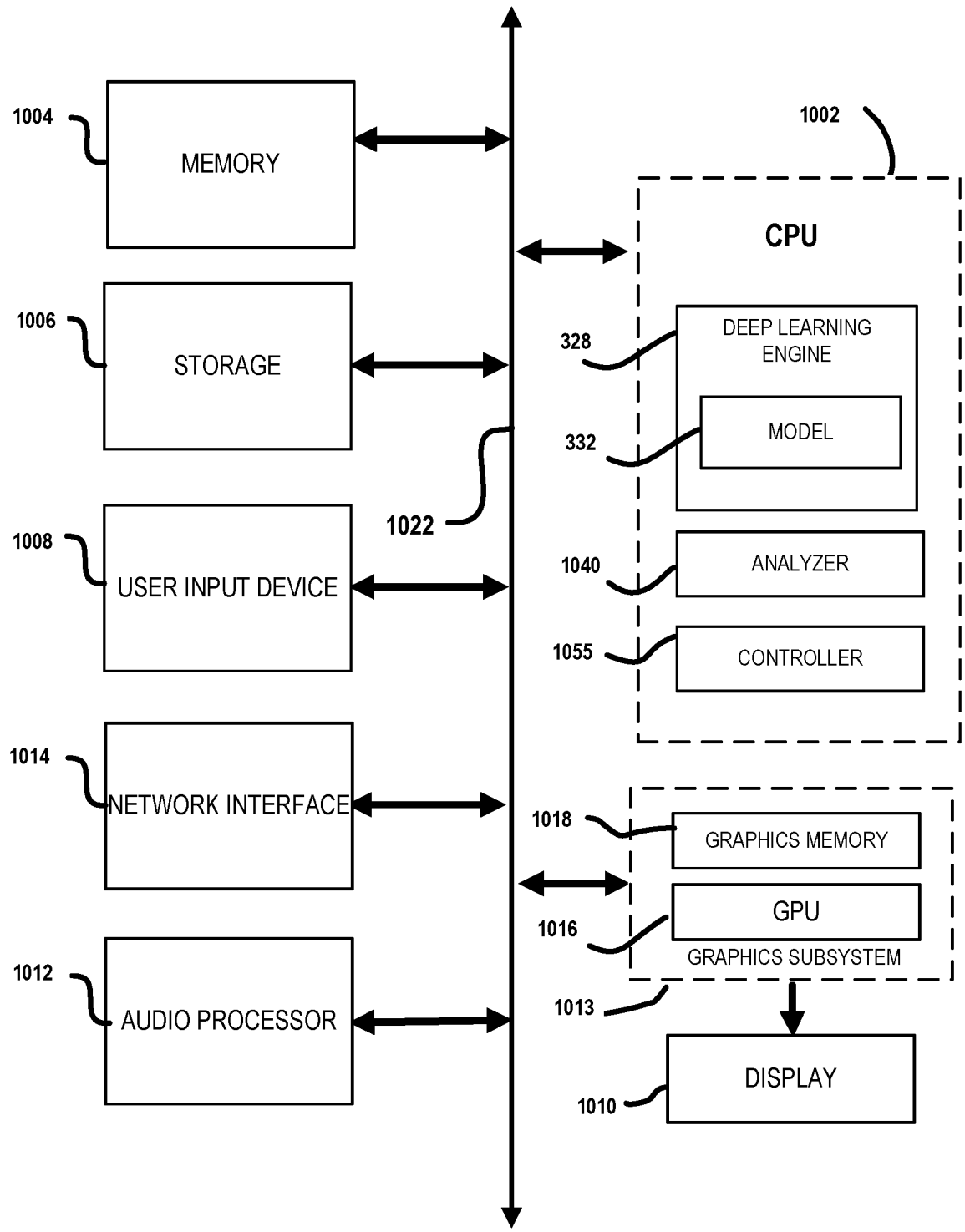
FIG. 10 illustrates components of an example server computing device used for building and training a predicate model (i.e., an artificial intelligence (AI) model) using a model training algorithm, in accordance with one implementation of the present disclosure.

FIG. 10 illustrates components of an example server device 302 that can be used to perform aspects of the various embodiments of the present disclosure. For example, FIG. 10 illustrates an exemplary server system with hardware components suitable for training an AI model that is capable of performing various functionalities in relation to an online game and/or game plays of the online game, in accordance with one embodiment of the present disclosure. This block diagram illustrates a device 302 that can incorporate or can be a personal computer, a server computer, gaming console, mobile device, or other digital device, each of which is suitable for practicing an embodiment of the invention. Alternately, the functionalities of the device could be implemented in a physical server or on a virtual machine or a container server. Device 302 includes a central processing unit (CPU) 1002 for running software applications and optionally an operating system. CPU 1002 may be comprised of one or more homogeneous or heterogeneous processing cores.

In accordance with various embodiments, CPU 1002 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 1002 may be configured to include an AI engine 328 that is configured to support and/or perform learning operations with regards to providing various functionalities (e.g., predicting) in relation to an online game and/or game plays of the online game. The deep leaning engine (i.e., AI engine) 328 may include a modeler that is configured for building and/or training the AI model 332 that is configured to provide the various functionalities related to the online game and/or game plays of the online game. Further, the CPU 1002 includes an analyzer 1040 that is configured for generating and training an AI model. The trained AI model provides an output in response to a particular set of users' inputs, wherein the output is dependent on the predefined functionality of the trained AI model 332. The trained AI model 332 may be used to determine the predicate list of activities that is to be identified for the game to meet the game objective defined for the online game by the user. The analyzer 1040 is configured to perform various functionalities in relation to the online game and/or game plays of the online game, including analyzing the output from the trained AI model 332 for a given input (e.g., game objective criteria), and provide a response.

Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to device (i.e., cloud gaming server) 302, examples of which may include keyboards, mice, joysticks, touch pads, touch screens, still or video recorders/cameras, game/input controllers 1055, and/or microphones. Network interface 1014 allows device 302 to communicate with other computer systems (i.e., other cloud gaming servers and/or client devices) via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of device 302, including CPU 1002, memory 1004, data storage 1006, user input devices 1008, network interface 1014, and audio processor 1012 are connected via one or more data buses 1022.

A graphics subsystem 1013 is further connected with data bus 1022 and the components of the device 302. The graphics subsystem 1013 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1016, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs. In one embodiment, GPU 1016 may be implemented within AI engine to provide additional processing power, such as for the AI or deep learning functionality.

The graphics subsystem 1013 periodically outputs pixel data for an image from graphics memory 1018 to be displayed on display device 1010, or to be projected by projection system 1040. Display device 1010 can be any device capable of displaying visual information in response to a signal from the device 302, including CRT, LCD, plasma, and OLED displays. Device 302 can provide the display device 1010 with an analog or digital signal, for example.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

The invention claimed is:

1. A method for providing assistance in an online game, comprising:
    receiving a game objective of a user playing the online game;
    identifying a current location of the user in the online game;
    accessing a predicate model generated and trained by machine learning algorithm using telemetry data obtained from game play sessions of a plurality of players, the telemetry data providing information related to characteristics of each activity of the online game and user attributes of each of the plurality of players who accomplished said activity of the online game;
    analyzing information provided in the predicate model to identify activities the user has to perform to accomplish the game objective, the activities identified based on the current location of the user in the online game and by matching current game play attributes of the user with game play attributes of the plurality of players that accomplished the game objective during the game play sessions; and
    providing-a predicate list of the activities identified from the analysis, wherein each entry in the predicate list identifies the activities defining a distinct path followed by each player to accomplish the game objective, the predicate list specifying a sequence of the activities the user has to perform to achieve the game objective of the online game,
    wherein the activities included in the predicate list are dynamically updated without requiring user input, based on changes to the current location of the user detected as the user progresses in the online game, and
    wherein operations of the method are performed by a predicate list generator engine executing on a processor of a computing device, the predicate list generator engine engaging the machine learning algorithm.

2. The method of claim 1, wherein the information provided in the predicate model is analyzed in association with a map of vector points defined for the online game, each vector point in the map corresponds to an activity that can be performed in the online game, the analysis identifying one or more vector points corresponding to activities performed by each player of the plurality of players to achieve the game objective.

3. The method of claim 2, wherein analyzing the information further includes,
    traversing the map of vector points in a backward direction from a location of a first vector point corresponding to the game objective to a second vector point corresponding to the current location of the user in the online game to identify the one or more vector points corresponding to activities performed by each player of the plurality of players to achieve the game objective.

4. The method of claim 2, wherein the map is a three-dimensional (3D) map and a vector point identifies a location within the 3D map where an activity is defined to occur.

5. The method of claim 1, wherein the predicate model is generated and trained using the telemetry data of prior game play sessions, additional training of the predicate model performed using telemetry data of subsequent game play sessions of the plurality of players.

6. The method of claim 1, wherein the predicate list generated for the user includes a subset of activities performed by each player in achieving the game objective, wherein the subset of activities of said player is less than all the activities attempted and accomplished by said player and includes activities followed by said player from the current location of the user onward.

7. The method of claim 1, wherein the plurality of players are part of a league or part of a team or individual players or social contacts of the user, and
 wherein the telemetry data is obtained from prior game play sessions or from current game play session of the online game.

8. The method of claim 1, wherein the analysis of the predicate model results in identifying characteristics of each activity of the online game and user attributes of each player of the plurality of players who performed said activity to achieve the game objective of the online game.

9. The method of claim 1, wherein each activity in the predicate model is associated with a weight, the activities identified for inclusion in the predicate list of the user is based on the weights of the activities identified from analyzing the information, and
 wherein the weight associated with each activity is influenced at least in part by number of players of the plurality of players that completed the activity to achieve the game objective.

10. The method of claim 1, wherein the predicate model includes a plurality of nodes and an edge connecting two consecutive nodes, each node includes characteristics of an activity associated with the node and each edge connecting two consecutive nodes identifies one or more relationships between the characteristics of the activities associated with the two consecutive nodes, information for the nodes and edges obtained from the telemetry data of the plurality of players obtained from prior game play sessions.

11. The method of claim 1, wherein the current location of the user is identified using in-game GPS, and
 wherein the game objective defines a game level or an activity or a type of activity to achieve or an event to attend or an amount of time specified to achieve the game objective or number of activities to perform, or any combinations thereof.

12. The method of claim 1, wherein the predicate list provides an indication of a distance the user has to travel from the current location to a location of the game objective and a number of activities that the user has to perform to travel the distance to achieve the game objective, and
 wherein each of the activities in the predicate list is an action, or an operation, or an event to be performed, or an instruction to be followed in the online game.

13. The method of claim 1, further includes generating a progression graph for each player of the plurality of players that has played the online game, the progression graph of said player being populated with vector points associated with the activities performed by said player to achieve the game objective, the progression graph of said player being a subset of a map of vector points generated for the online game, the progression graph including information related to vector points that correspond to activities completed by said player, characteristics of each of the activities completed by said player, and attributes of said player captured in the telemetry data.

14. The method of claim 1, wherein an activity in the predicate list is a macro activity and includes a plurality of micro-activities that has to be performed as part of completing the macro activity, and, wherein the macro activity is represented in the predicate list with a visual indicator to indicate presence of the plurality of micro-activities.

15. The method of claim 1, wherein the predicate list provided to the user includes a list of activities that the user can accomplish, one or more user attributes of select ones of the plurality of players that accomplished each activity identified in the list of activities, and one or more characteristics of each activity identified in the list of activities, and
 wherein the predicate list is provided in a map format or a table format or a text format.

16. The method of claim 1, wherein providing the predicate list includes,
 building a progression graph for presenting to the user based on the activities the user has completed in the online game, the progression graph identifying the current location of the user in the online game; and
 updating the progression graph of the user with locations of activities from the predicate list so as to provide a visual map identifying a portion of the online game with the locations of the activities from the predicate list mapped in relation to the current location of the user, wherein the locations of the activities are represented using vector points,
 wherein the progression graph is dynamically updated in accordance to changes detected in the current location of the user.

17. A method for providing assistance in an online game, comprising:
 identifying a current location of the user in the online game;
 accessing a predicate model generated and trained by machine learning algorithm using telemetry data obtained from game play sessions of a plurality of players, the telemetry data providing information related to characteristics of each activity of the online game and user attributes of each of the plurality of players who accomplished said activity of the online game;
 analyzing information provided in the predicate model to identify activities the user is qualified to perform in the online game based on current game play attributes of the user and the current location of the user in the online game, the activities identified by matching the current game play attributes of the user with game play attributes of the plurality of players that accomplished the identified activities during the game play sessions; and
 providing a predicate list of the activities identified from the analysis, wherein each entry in the predicate list identifies the activities defining a distinct path followed by each player of the plurality of players to accomplish the game objective, the predicate list specifying a sequence of the activities the user has to follow to progress in the online game,
 wherein the activities included in the predicate list are dynamically updated, without requiring user input, based on changes to the current location of the user detected as the user progresses in the online game, and
 wherein operations of the method are performed by a predicate list generator engine executing on a processor of a computing device, the predicate list generator engine engaging the machine learning algorithm.

18. The method of claim 17, wherein the predicate list is dynamically adjusted to update activities based on an activity completed by the user, wherein the activity completed by the user is an activity proximate to the current location of the user in the online game or an activity identified in the predicate list, or an activity proximate to the activity identified in the predicate list.

19. The method of claim 17, wherein an activity in the predicate list is a macro activity with a plurality of micro activities, and wherein the macro activity is represented in the predicate list with a visual indicator to indicate presence of micro-activities.

* * * * *